Figure 1:
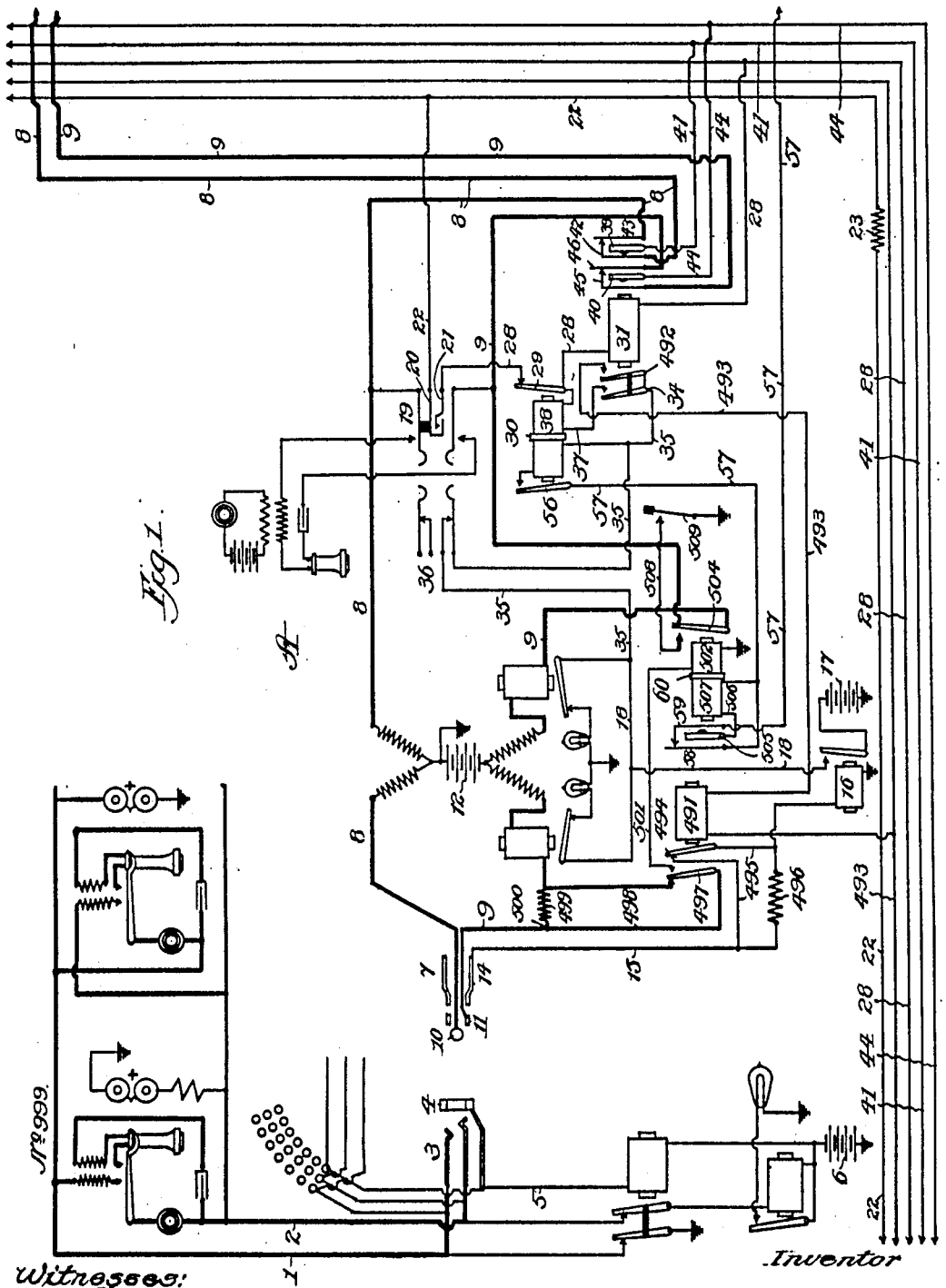

A. M. BULLARD.
SEMI-MECHANICAL TELEPHONE EXCHANGE SYSTEM.
APPLICATION FILED FEB. 5, 1907.

1,161,608.

Patented Nov. 23, 1915.
9 SHEETS—SHEET 3.

Witnesses:

Inventor:
Albert M. Bullard,
By Barton, Tanner & Folk
Attys.

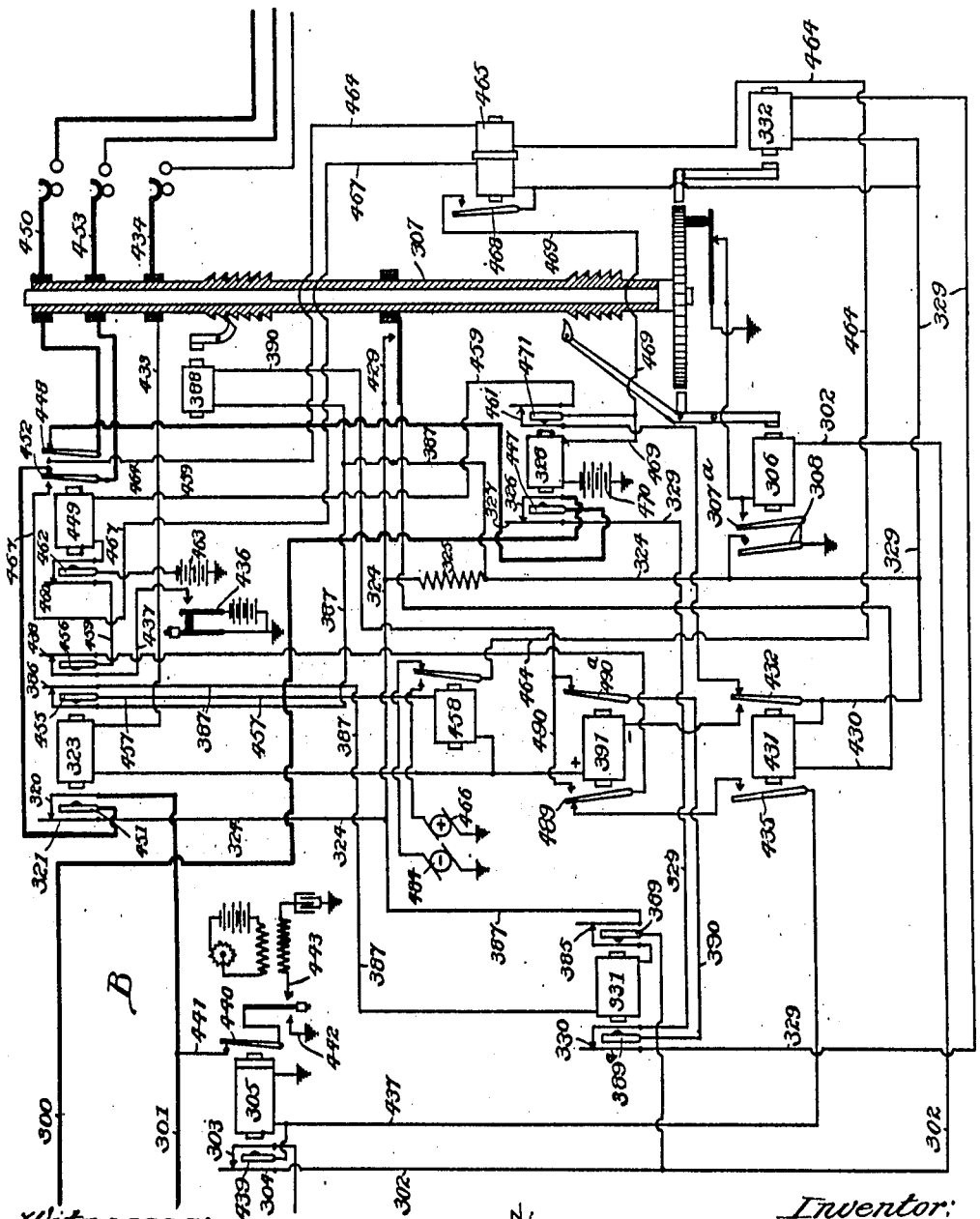

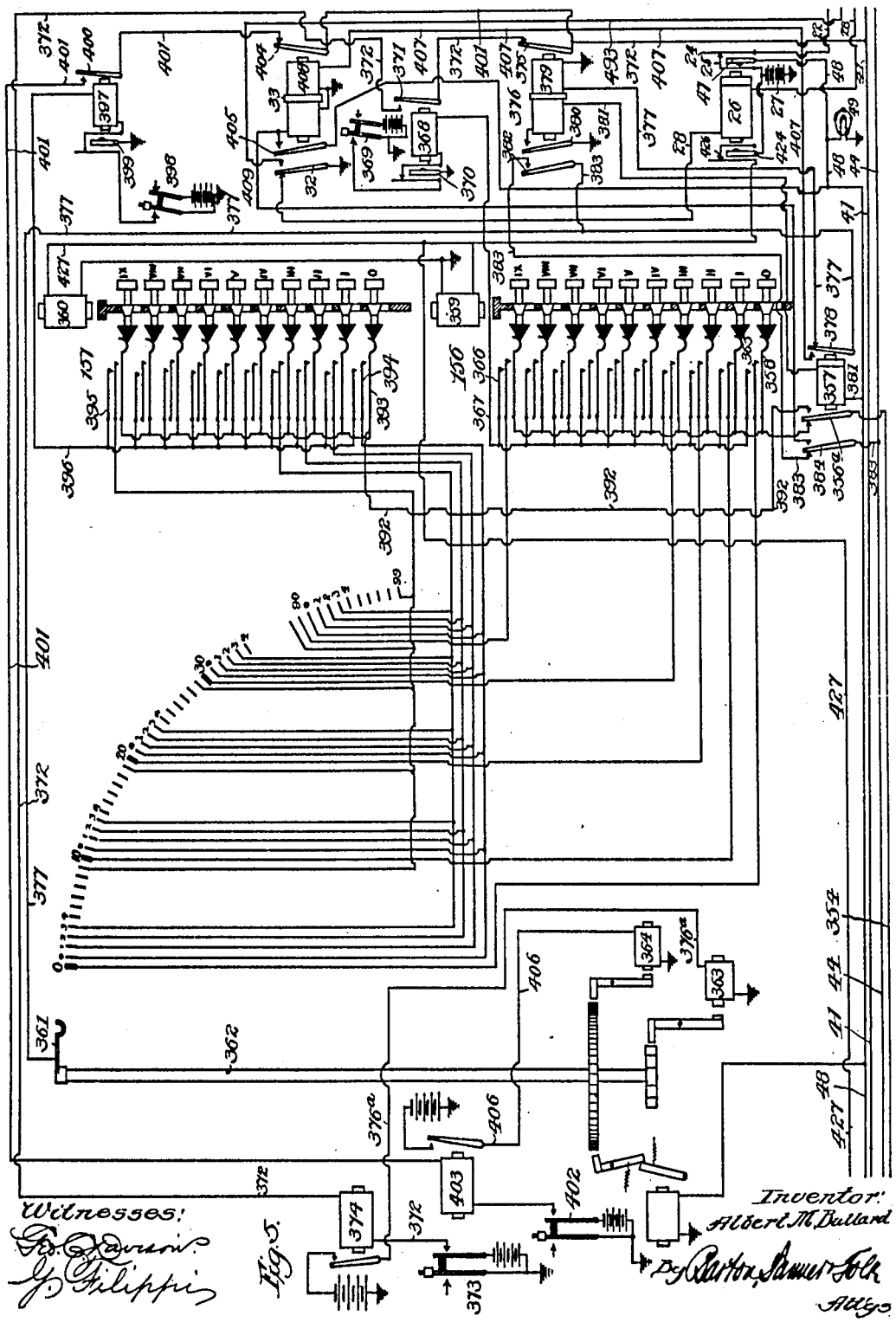

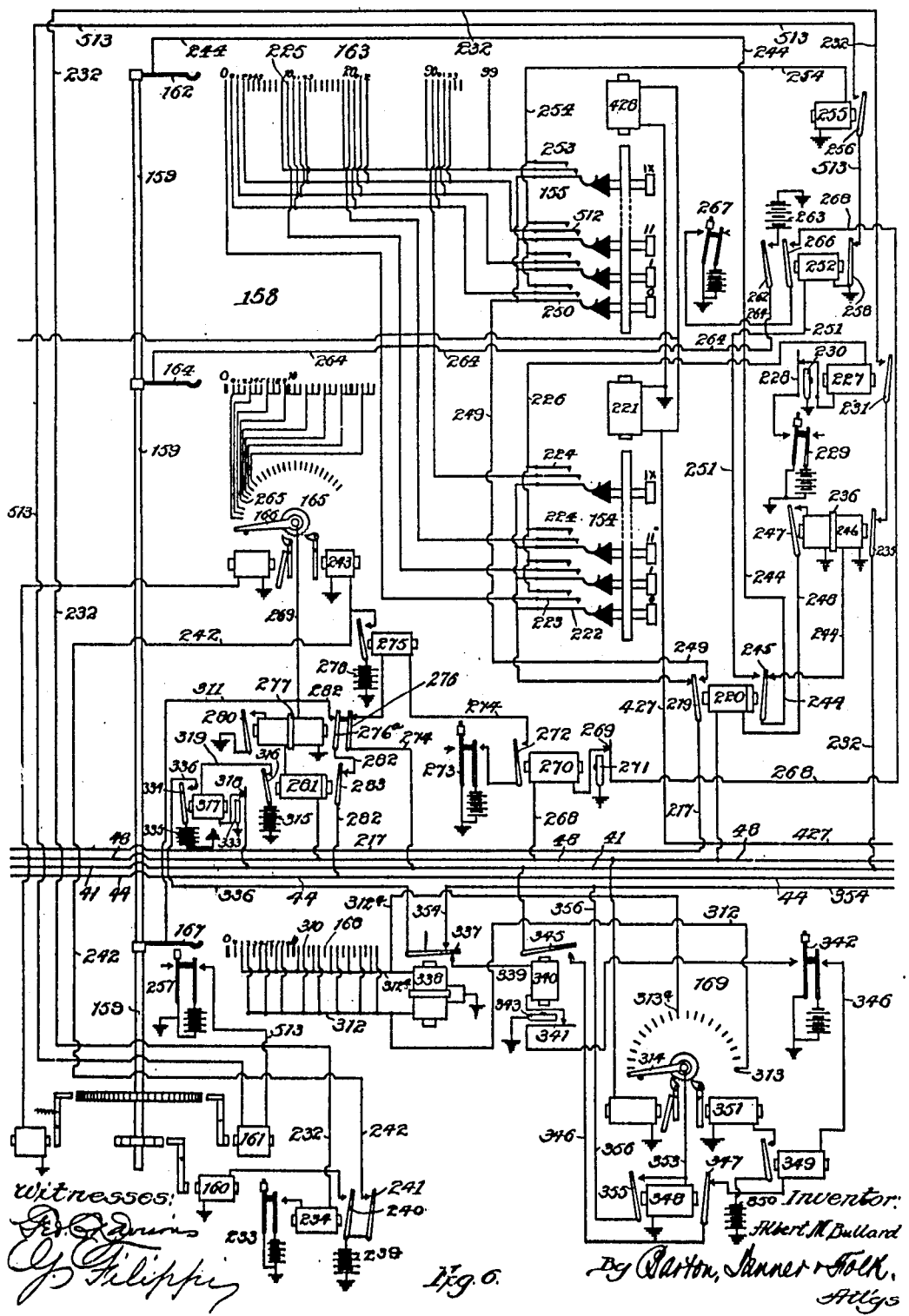

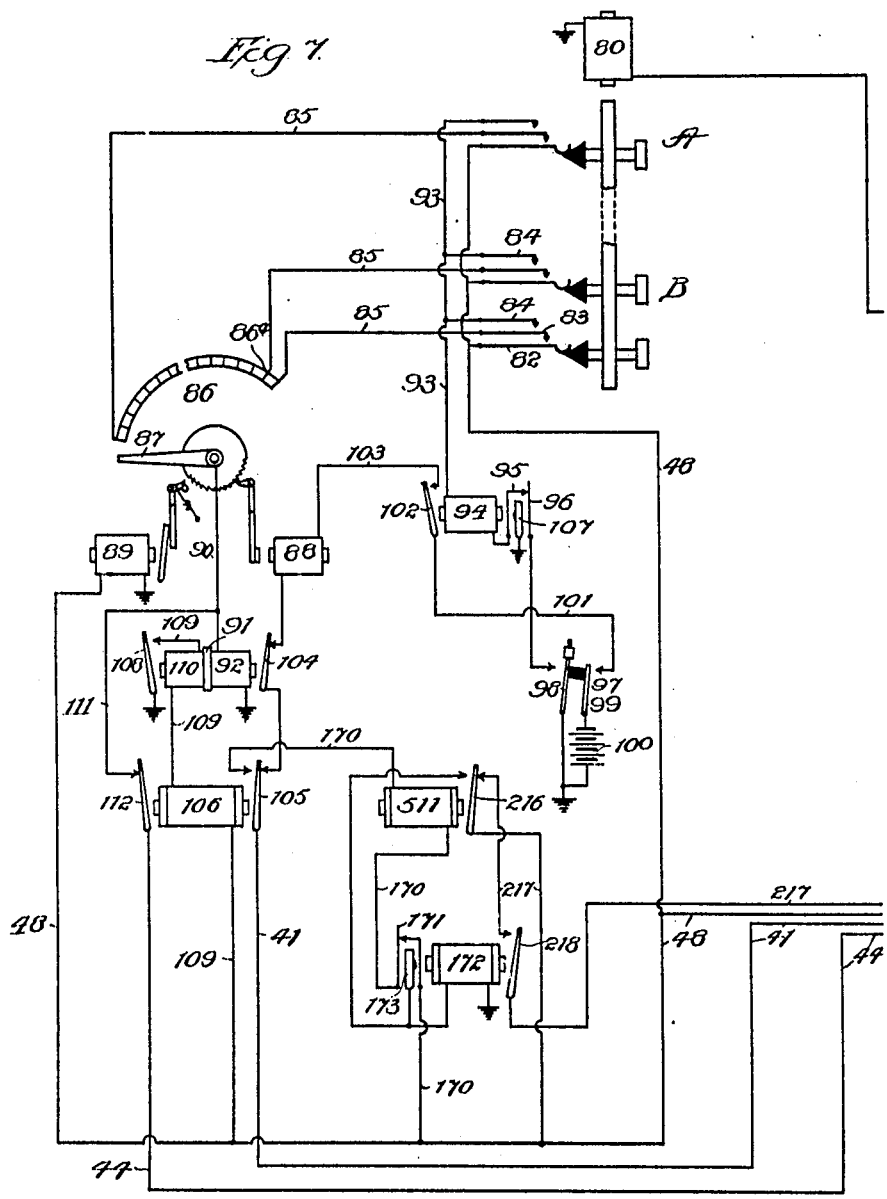

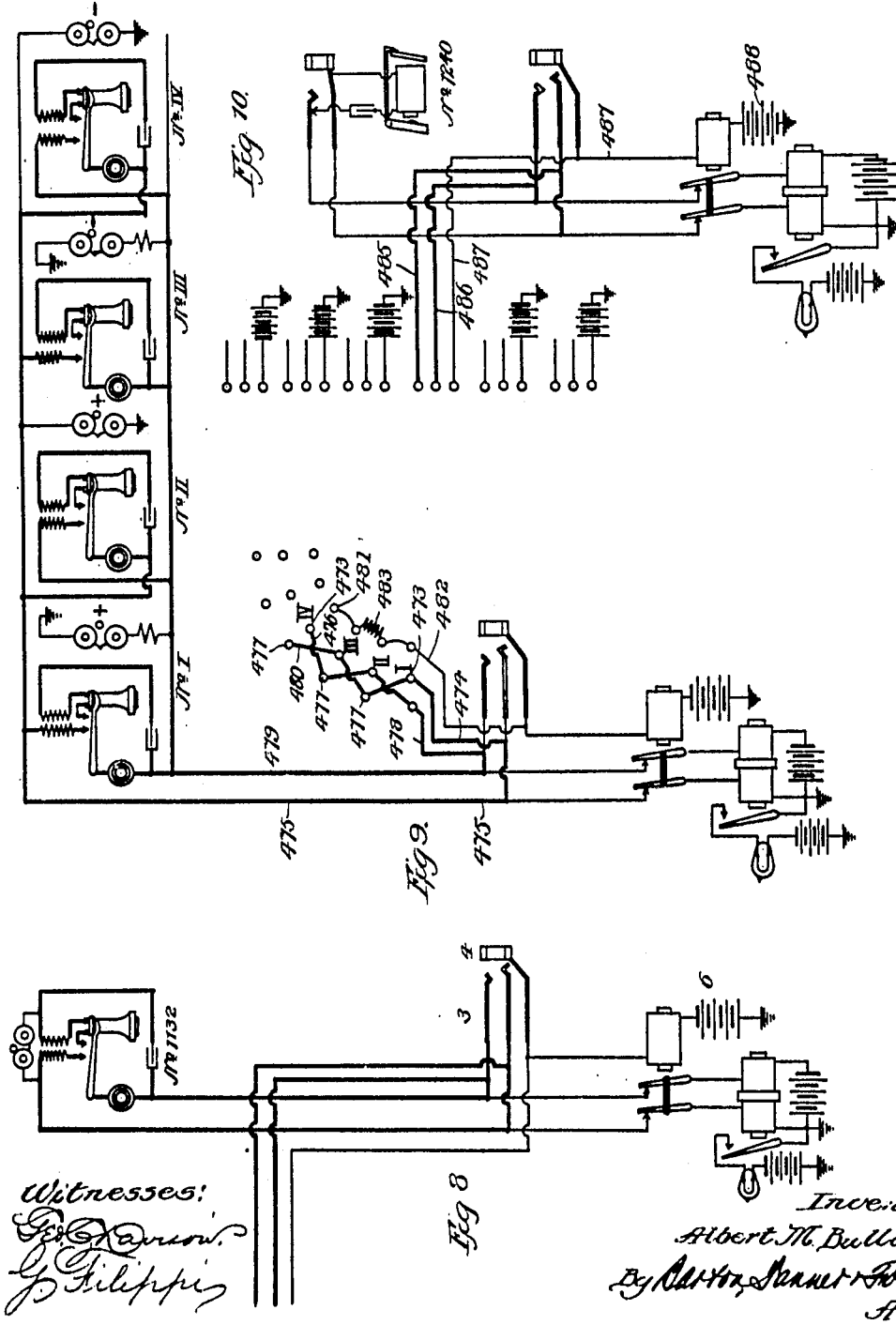

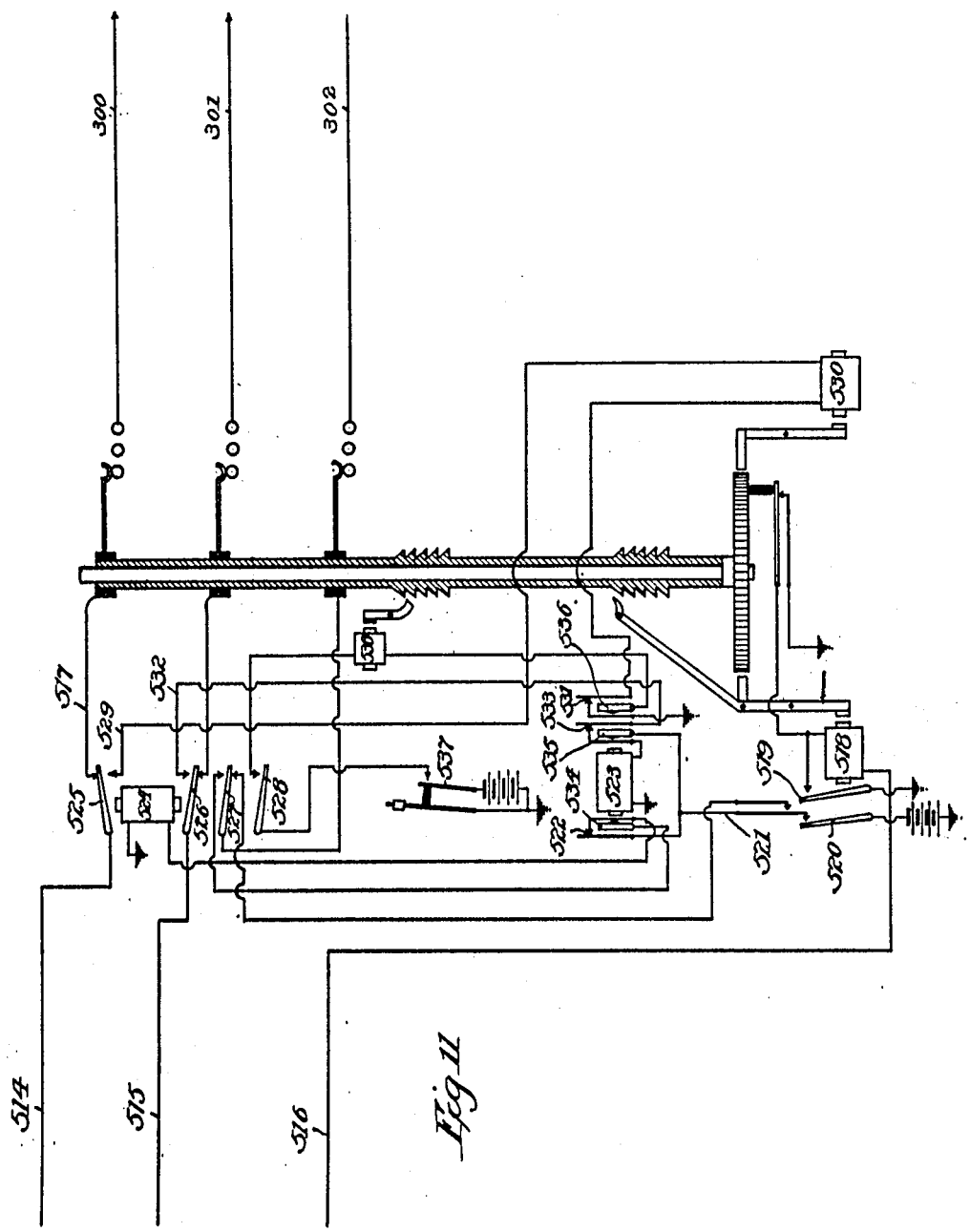

UNITED STATES PATENT OFFICE.

ALBERT M. BULLARD, OF NEW YORK, N. Y., ASSIGNOR TO WESTERN ELECTRIC COMPANY, OF CHICAGO, ILLINOIS, A CORPORATION OF ILLINOIS.

SEMI-MECHANICAL TELEPHONE-EXCHANGE SYSTEM.

1,161,608.  Specification of Letters Patent.  Patented Nov. 23, 1915.

Application filed February 5, 1907. Serial No. 355,896.

*To all whom it may concern:*

Be it known that I, ALBERT M. BULLARD, a citizen of the United States, residing at New York, in the county of New York and State of New York, have invented a certain new and useful Improvement in Semi-Mechanical Telephone-Exchange Systems, of which the following is a full, clear, concise, and exact description.

My invention relates to a telephone exchange system wherein the operator at the central office answers the call of a subscriber in the usual way by uniting her connecting circuit with such subscriber's line, and mechanical switching mechanism completes the connection by uniting the connecting circuit with the called line.

The object of my invention is to provide an improved system which will be very efficient and reliable in operation and make possible great speed and precision in establishing connections.

In a system to which my invention is applicable connecting circuits are provided at the central office with switches, preferably manually operable such as plugs and jacks, for extending the circuits of calling lines, and automatic switches for extending the connecting circuits to the wanted lines. The automatic switches, of which there are usually several operated in succession through trunk lines for each connection, may be, as in the system herein described, controlled by operators' sending mechanisms associated with the connecting circuits.

In accordance with one feature of my invention an automatic ringing apparatus is provided in such a system as that described above in association with a final selector switch or connector and made operative under the control of said switch or connector to apply ringing current to the wanted line when connection is made thereto.

Another feature of my invention relates to a new and improved arrangement of circuits and apparatus in association with automatic switches, whereby, when connection is made with a party line, ringing current of the proper character is applied to such line to signal the subscriber thereof. In accordance with this feature there is provided one terminal or set of terminals on the final selector for each substation on the line, and the test terminals of such line are connected together with a resistance included in the conductor between certain terminals. In the case of four party lines, the line terminals of certain subscribers are transposed with respect to those of other subscribers of the same line. This arrangement, in association with certain relays and testing means associated with the final switch, enables the proper ringing current, preferably positive or negative pulsating, to be applied to one side of the subscriber's line or the other upon connection being made thereto.

Another feature of my invention relates to a new and improved arrangement of circuits and apparatus for controlling the operation of the selector switches. In accordance with this feature the controller operating magnet and the selector operating magnet are energized by pulsating current, the two magnets operating one after the other, and the extent of movement of the selector being determined by a switch actuated by the controller when it has been advanced a predetermined number of steps.

I will describe my invention particularly by reference to the accompanying drawings, which illustrates the preferred embodiment thereof, reserving for the appended claims a statement of the parts, improvements and combinations which I consider novel with me.

In the drawings Figures 1, 2, 3, 4, 5, 6 and 7 represent an arrangement of circuits and apparatus of a telephone exchange system embodying my invention; Fig. 8 represents a single-station line leading to terminals upon the connector shown in Fig. 4; Fig. 9 shows a four-party line with its connector terminals arranged for selective signaling; and Fig. 10 shows a private branch exchange and its trunk lines and connector terminals. Fig. 11 shows a simplified arrangement of the apparatus associated with the primary selector which may be used in connection with primary selectors to which the trunks from the office selector terminating and originating in the same exchange may be connected.

In tracing the system the drawings should be considered in order of Figs. 7, 6, 5, 1, 2, 3, 4, 8, 9, 10.

In a system of, for example, 100,000 lines, there may be provided ten offices, at each of which terminate 10,000 lines. At each office the lines may be arranged in groups of 300, although groups of any number might be employed. With such an arrangement there would be approximately 34 groups of 300 lines at each office, or to be exact 33 groups of 300 lines and one group of 100. Each connector has a capacity of 300 lines and enough connectors are furnished to handle the calls for each group. The operator in an exchange answers a call in the usual way by uniting her connecting circuit with the line of the calling subscriber, and after ascertaining the number of the called party and the exchange where the line of such party terminates, operates her sending apparatus, depressing the key thereof which represents the desired office, and the thousands, hundreds, tens and units digit keys representing the number of the line wanted. An office selector forms the terminals of the connecting circuit referred to, and is operated by mechanism controlled by the actuated office key to unite the connecting circuit with an idle trunk line leading to the desired office. Said trunk line terminates at the desired office in a primary selector, which is a machine adapted to select an idle connector belonging to any one of the 34 groups.

A translator is provided in connection with the sending outfit to cause the thousands and hundreds keys depressed to operate the primary selector and pick out an idle connector of the group desired. The first 300 lines in the exchange are number 0000 to 0299. These numbers would be reached by pressing the "naught" button of the thousands keys and the "1" or "2" button of the hundreds keys. There is a primary controller forming part of the sending outfit, which controls the operation of the primary selector, the two being operated together in series. The translator is provided with three brushes. The first is associated with the thousands and hundreds keys and arranged to stop the translator at a predetermined point to cause the second brush and the primary controller, which are automatically brought into circuit when the translator has stopped, to advance the primary selector into position to connect with the desired connector. The third brush has associated therewith an auxiliary controller, and said brush, after the operation of the primary controller, automatically brings into play the auxiliary controller, which advances the brushes of the selected connector to the proper hundreds zone of the three zones of one hundred lines each of such connector. The depressed tens and units keys are now brought successively into service, mechanism controlled thereby operating the selected connector to cause the brushes thereof to unite with the terminals of the desired line in the selected zone.

I will now describe in detail the circuits and apparatus employed in connecting the subscriber No. 999 shown in Fig. 1, whose line terminates at office "A", with the line of the subscriber No. 1132, shown in Fig. 8, whose line terminates at exchange "B."

The line of subscriber No. 999, Fig. 1, extends in two limbs 1, 2 from the substation to the central office "A", where the line extends through the usual line signal apparatus to the poles of a central battery. At the central office, the usual answering jack 3 is provided for the line, the thimble 4 of said jack being connected with a conductor 5 which leads through the usual cut-off relay to the free pole of a grounded battery 6. The operator is provided with an answering plug 7, with which to unite her connecting circuit with the calling line, the plug 7 and jack 3 constituting a manual connection switch.

Figure 2:
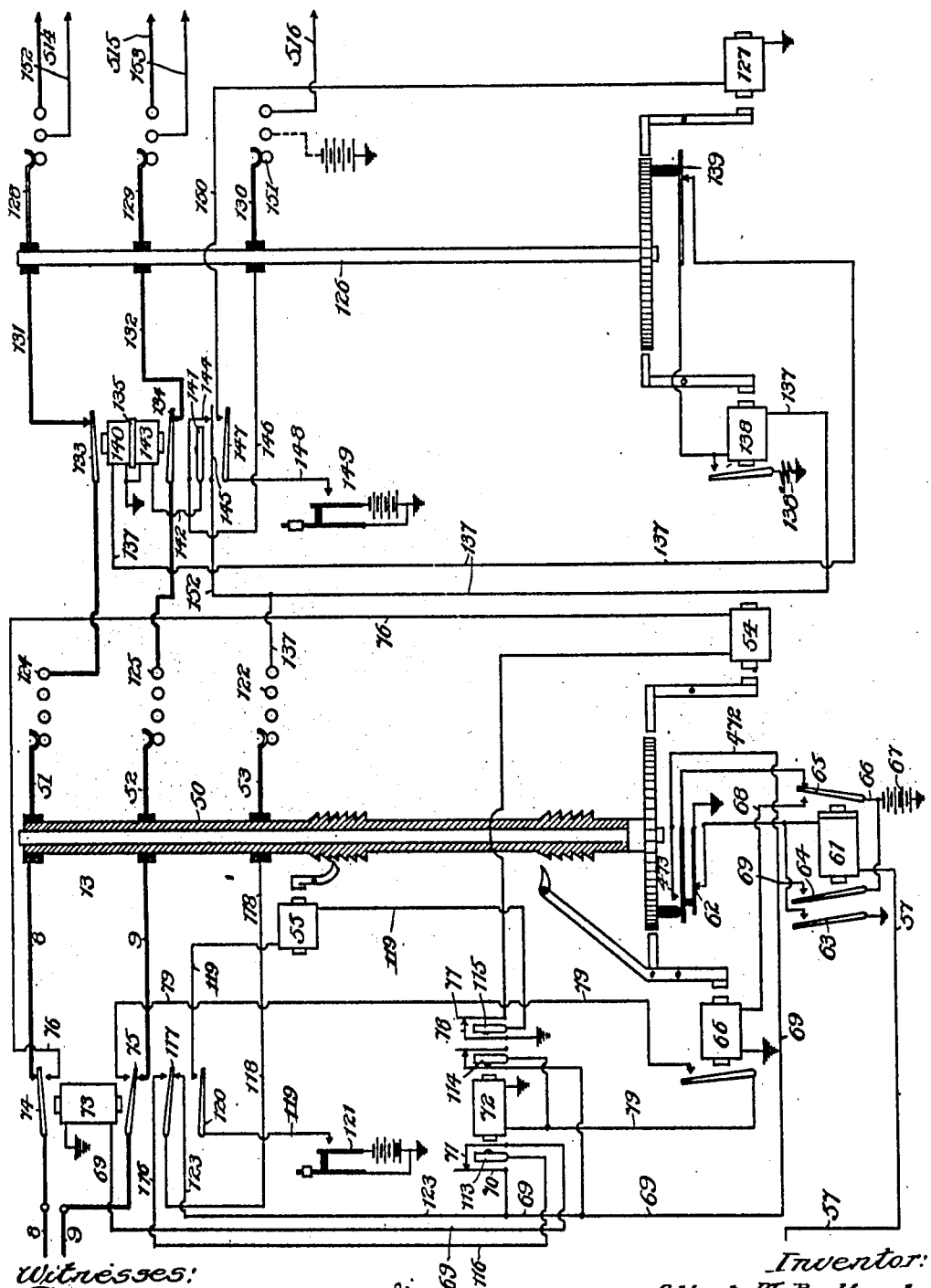
Figure 3:
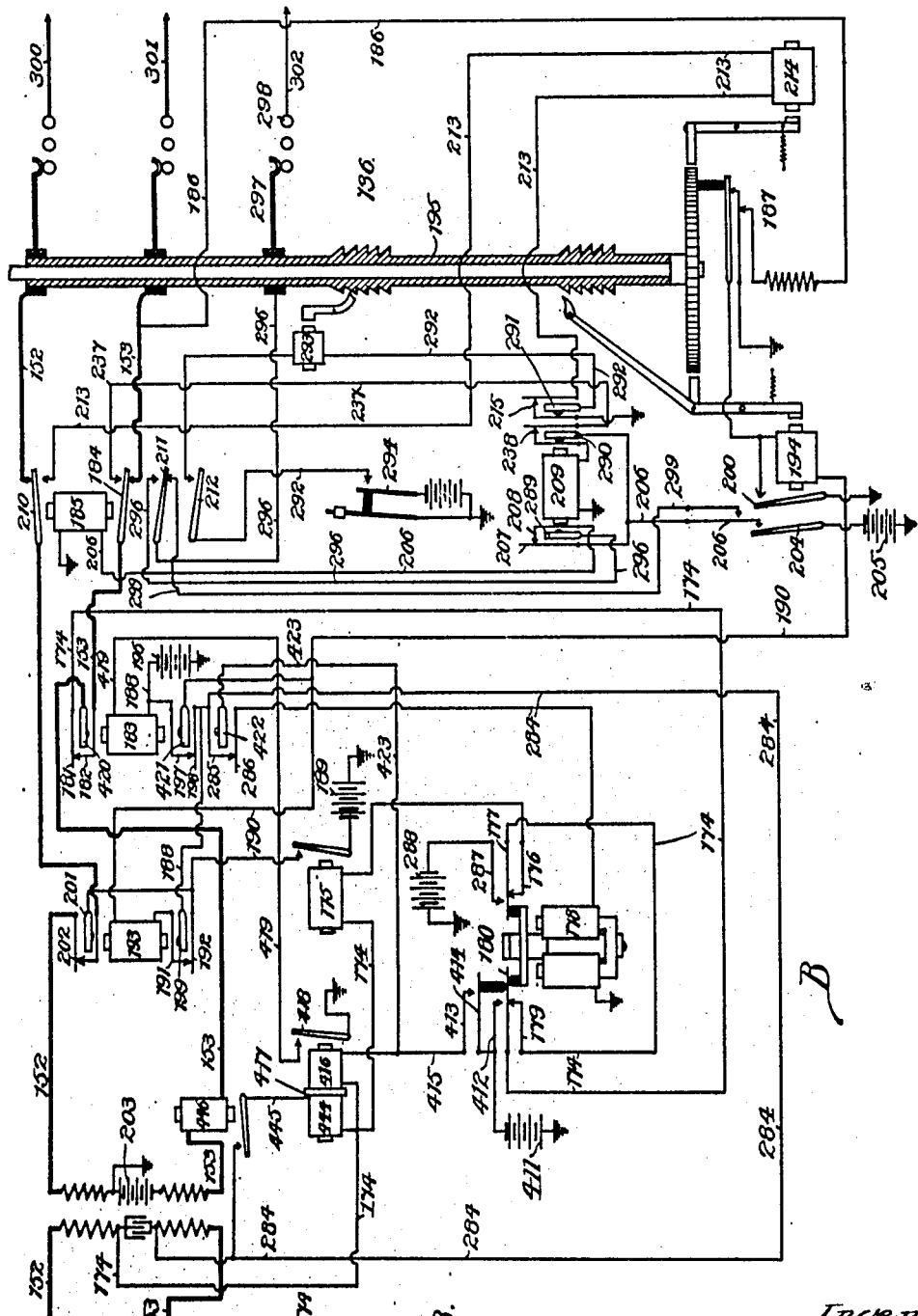

The link conductors 8, 9 of the operator's connecting circuit lead from the tip 10 and ring 11, respectively, of the answering-plug, through the windings of the usual repeating coil, between which is bridged a battery 12 in the usual manner, to the line brushes of an office selector 13, Fig. 2, a supervisory relay being included in link conductor 9 between the battery and the ring of the plug for controlling the usual supervisory signal. The sleeve 14 of the answering plug is connected with a conductor 15 which leads to earth through the winding of a relay 16. Said relay 16, whose circuit 5, 15, is completed upon the closure of the connection-switch, is provided with an armature connected with the free pole of the battery 17, the front contact of said armature being connected with a conductor 18 leading through contacts of the supervisory relays and the supervisory lamps to earth.

A key 19 is provided in association with the conductors 8, 9 of the connecting circuit, adapted, when operated, to connect the operator's telephone set with the link conductors of the connecting circuit, and also to close a pair of contacts, 20, 21, which control the placing of the sending apparatus into condition to serve the connecting circuit. The contact 20 is connected with a conductor 22 which leads through a resistance 23 and springs 24, 25, associated with relay 26, to the free pole of a grounded battery 27, Fig. 5, while the contact 21 is connected with a conductor 28 which leads through the armature 29 and back contact of relay 30, windings of relays 31 and 26, through the armature 32 and back contact of relay 33 to earth. Thus when key 19 is operated, the circuit 22, 28 is completed to operate relays 31 and 26.

Referring first to relay 31, its armature 34 is connected with a conductor 35 which leads through the contacts of a key 36 to conductor 18, said conductor 18 being connected by the armature of relay 16 with the free pole of battery 17. The front contact of the armature 34 of relay 31 is connected with a conductor 37 which leads through the winding 38 of relay 30 to the armature 29 thereof. A locking circuit is now completed for the relays 31 and 26 independent of battery 27, said circuit extending from the free pole of battery 17, by way of conductors 18, 35, armature 34 and front contact of relay 31, winding 38 of relay 30 to conductor 28, thence through the winding of relay 26 to earth. The armature 29 of relay 30 is now operated and disconnects the key 19 from the circuit of the magnets 31, 26, so that the operator may at any subsequent time during the process of establishing the connection, or during the connection, listen in on the circuit without interfering with the sending apparatus. The resistance 23 in conductor 22 is for the purpose of preventing a short-circuit of the relay 30 when the armature 34 of relay 31 closes the branch through winding 38 of relay 30 from battery 17. The relay 31 is also provided with armatures 39, 40. The armature 39 is connected with a common wire 41 leading to the sending apparatus, and said armature is adapted when attracted to engage the member 42 of a pair of normally closed springs 42, 43, included in the strand 8 of the connecting circuit, to separate said springs, the spring 42 being connected with the portion of the conductor 8 leading to the office selector. In like manner, the armature 40 is connected with a common wire 44 leading to the sending apparatus, said armature being adapted to engage the member 45 of a pair of springs 45, 46, which are normally included in the ring strand 9 of the connecting circuit, to separate said springs, the spring 45 being connected with the portion of the strand 9 leading to the office selector. Armatures 39, 40 therefore, in their attractive movement, connect the strands 8, 9 of the connecting circuit with common wires 41, 44 leading to the sending apparatus.

The relay 26, Fig. 5, in operating attracts its armature 47, which separates the springs 24, 25, included in conductor 22, said armature 47 engaging the spring 25 which is connected with the free pole of grounded battery 27. The armature 47 is connected with a feed wire 48 which supplies battery to the mechanism of the sending apparatus, and also to a lamp signal 49, which remains displayed while the sending apparatus is in use. The retaining magnets of the sending apparatus are permanently connected with the feed wire 48, and are operated the instant battery is applied by relay 26 to the feed wire. The sending apparatus is now in operative condition to serve the connecting circuit.

*Operation of the office selector.*—The office selector, Fig. 2, is provided with a shaft 50 arranged to have two movements—a rotary movement to select a group of trunk lines leading to a particular office, or as in the present case, a group of trunk lines leading to trunk selectors adapted to select an idle inter-office trunk, and a longitudinal or upward movement to select the first idle trunk line of such group. The shaft carries three brushes, 51, 52, 53, brushes 51 and 52 being connected with the strands 8, 9 of the connecting circuit, and the brush 53 being the local brush. The shaft 50 is adapted to be rotated by means of the magnet 54 and mechanism controlled thereby, and to be moved upward by a magnet 55 and its associated apparatus. The relay 30, Fig. 1, when operated, as before described, serves to place the office selector in condition for operation. The armature 56 of relay 30 is connected with the conductor 57 which leads from conductor 35 and battery 17 through a winding of relay 30, armature 56 and its contact of said relay, contact springs 58, 59 of relay 60 to the office selector, and thence through the winding of a relay 61 and through a pair of contacts 62 closed by the shaft 50 when in normal position, to earth. A circuit for relay 61 is thereby provided by way of conductors 18, 35, 57. The said relay 61 when energized attracts its armatures 63, 64 and 65; the armature 63 being connected with earth and when attracted completing a locking circuit for the relay 61 independent of contacts 62. The armature 65 is connected with the free pole of a grounded battery 67, said armature when attracted engaging its front contact which is connected with a conductor 68 leading to earth through the winding of the retaining magnet 66 of the shaft 50. The armature 64 of said relay is connected with the free pole of battery 67 and the front contact of this armature is connected with a conductor 69 which leads through the contact springs 70, 71, associated with relay 72, through the winding of relay 73 to earth. Relay 73 is provided with two armatures 74, 75, which with their back contacts are normally included in the strands 8, 9, of the connecting circuit, the armatures being connected directly with the portions of the strands leading to the plug 7. The armature 74 is adapted when attracted to engage a front contact which is connected with the conductor 76 leading through the rotary stepping magnet 54 of the shaft 50, through the contact-springs 77, 78, associated with relay 72, to earth. The armature 75 of relay 73 when attracted is adapted to engage a front contact connected with a conductor 79 which leads through the armature and front contact of retaining magnet 66, relay 72, to earth. The office selector is now in condition for operation.

Turning now to the sending apparatus, I will describe the means adapted to be set by the operator to actuate the office selector and select an idle trunk line leading to the exchange where the called party's line terminates. In the present case the selector selects a trunk line which leads to an idle trunk selector, said selector thereupon operating to pick out an idle trunk line leading to the desired office. I will assume that the line of the party with whom conversation is desired terminates at office B, and that his number at said office is 1132. The operator, therefore, after listening in to ascertain the number of the line desired, depresses the office key B, key I of the thousands keys, key I of the hundreds keys, key III of the tens keys and key II of the units keys.

The office controller, Fig. 7, is provided with a series of keys, A, B, etc., which are known as the office keys. Each key comprises a plunger adapted when depressed to be locked in such position under the control of a release magnet 80. Each plunger may carry a latch member, preferably conical in form, adapted when the plunger is depressed to engage the under side of a latch bar to lock the plunger in its depressed position, said plunger, when the latch bar is operated by magnet 80 being restored by a suitable spring. Each of said keys, when depressed, forces into electrical contact springs 82, 83, 84. The spring 82 of each key is connected with the feed wire 48 previously referred to, which is connected by relay 26 with the free pole of battery 27. The spring 83 is connected with a conductor 85 which leads to a terminal of a bank of contacts 86 adapted to be engaged by the contact arm 87. Said arm is provided with a stepping magnet 88, the retaining magnet 89 of said contact arm being operated by current from the feed wire 48, as previously described. Said contact arm 87 is connected with a conductor 90 which leads to earth through winding 92 of relay 91.

The third spring 84 of each key is connected with a conductor 93 which leads through the winding of relay 94, springs 95, 96, associated therewith, to the ground contact of a pulsator 97, said contact being arranged to be intermittently engaged by the grounded spring 98 of said pulsator. The spring 99 of said pulsator is connected with the free pole of grounded battery 100, the contact of said battery spring being connected with a conductor 101 leading to the armature 102 of relay 94. The front contact of said armature 102 is connected with a conductor 103 which leads through the winding of the stepping magnet 88 of contact arm 87, armature 104 and back contact of relay 91, through the armature 105 and back contact of sluggish relay 106 to common wire 41.

Assume now that key B has been operated: Current will flow from the feed wire 48 by way of springs 82, 83, to the contact 86ª in the bank 86. Battery will also be applied from the feed wire through the springs 82, 83, 84, to conductor 93 and thence through winding of relay 94, springs 95, 96, of said relay to earth by way of the pulsator when spring 98 thereof engages its contact. When such contact is made, relay 94 is energized to attract its armatures 102, 107. Armature 107 is connected to earth and engages contact spring 95, separating the same from its anvil 96 and completing a locking circuit for relay 94 from the feed wire independent of the pulsator. Armature 102 in its attracted position connects the battery contact of the pulsator with conductors 101, 103. Impulses of current now flow from the free pole of battery 100 over conductors 101, 103, winding of the stepping magnet 88 of contact arm 87, over common wire 41, through armature 39 and spring 42 of relay 31, Fig. 1, to the tip-strand 8, armature 74 of relay 73 of the office selector, Fig. 2, conductor 76, through the stepping magnet 54 of the selector, springs 77, 78 of relay 72 to earth.

The pulsator 97, as already described, when in position to close its grounded contact completes a circuit for the relay 94 which connects the battery contact of the pulsator to the stepping magnets. This provision is made so that the first impulse applied to the stepping magnets will be a full one, that is, when the pulsator is engaging its ground contact it completes the circuit for relay 94, so that when it engages its battery contact the circuit for the stepping magnet will be ready to receive the complete impulse.

The stepping magnets 88, 54, respond together to the pulsating current and rotate the contact arm 87 of the controller and the shaft 50 of the selector, respectively. When the contact arm 87 of the office controller reaches the contact point 86ª, which is connected through the key B with the feed-wire, and the shaft 50 has been stepped around so as to bring its brushes in front of the group of terminals leading to trunk selectors adapted to pick out trunk lines leading to the desired office, current flows from the feed-wire through the contact springs 82, 83, conductor 85, contact 86ª of the bank 86, contact arm 87, conductor 90, through the winding 92 of relay 91 to earth. Relay 91 is thereby energized and attracts its armature 104, removing pulsating current from the stepping magnets 88, 54. The armature 108 of relay 91 is connected to earth while its front contact is connected with a conductor 109 which leads through the winding 110 of relay 91, winding of sluggish relay 106, to the feed wire.

The armature 108 therefore when attracted completes a locking circuit for relay 91, and also the circuit of the sluggish relay 106.

A conductor 111 extends from conductor 90 between the arm 87 and relay 91 to the back contact of armature 112 of sluggish relay 106, said armature 112 being connected with common wire 44, and when the arm 87 reaches the point 86ª at which battery is present, an impulse is delivered before the relay 106 has had time to operate, to conductor 44, from the feed wire, by way of key B, conductors 85, 90 and 111 and the armature 112 and back contact of relay 106. This impulse passes through the armature 40 and its contact 45 of relay 31, Fig. 1, strand 9 of the connecting circuit to the office selector, thence through armature 75 of relay 73 and its front contact to conductor 79, armature and front contact of retaining magnet 66, winding of relay 72 to earth. Relay 72 is thereupon operated and attracts its armatures 113, 114, 115. The armature 114 is connected with conductor 79 and is adapted when attracted to engage a contact connected with the conductor 69 which leads to the free pole of battery 67, thereby completing a locking circuit for the relay 72 from the free pole of battery 67, armature 64 of relay 61, conductor 69 to earth by way of armature 114 and conductor 79.

The armature 113 of relay 72 is connected with a conductor 116 which leads to the front contact of armature 117 of relay 73, said armature 117 being connected with a conductor 118 leading to the local brush 53 of the shaft 50. Said armature 113 of relay 72 when attracted engages the spring 71 connected directly to earth through relay 73, and connects said relay 73 through its own armature 117 and front contact with the local brush 53, for a purpose to be later explained.

The armature 115 of relay 72 when attracted engages contact spring 78 which is grounded, and separates the same from spring 77, thereby opening the branch 76 containing the stepping magnet 54. Said armature is connected with a conductor which leads through the lifting magnet 55 of the selector, armature 120 and front contact of relay 73, to the battery contact of a pulsator 121. The shaft 50 now begins its upward hunt for a trunk line leading to an idle selector adapted to pick out an idle trunk line leading to the office B. If the first trunk line is busy, battery will be present upon its local terminal 122, and will maintain relay 73 excited in the path provided by way of conductor 118, armature 117 of said relay and its front contact, conductor 116, armature 113 and front contact of relay 72, conductor 69 to earth; the armature 120 of said relay 73 while attracted maintains the circuit of the stepping magnet 55. When however an idle trunk line is reached by the brushes on the shaft 50, there will be no potential present at the local terminal 122 thereof, and the relay 73 will be deprived of current, and will release all its armatures; armature 120 opening the circuit of the lifting magnet 55; armatures 74, 75, restoring the continuity of the strands 8, 9 of the connecting circuit; and the armature 117 breaking the connection of relay 73 with the local brush 53, and connecting at its back contact conductor 118, leading from said brush, with a conductor 123 leading to conductor 69, which is connected by armature 64 of relay 61 with the free pole of battery 67. The brushes 51, 52, 53, of shaft 50, now rest in engagement with contact terminals 124, 125, 122, respectively, connected with a trunk line leading to a trunk selector.

The lowermost set of terminals 122, 125, 124, as well as the sets above in each of the vertical rows preferably form stopping points for the office selector arm and lead to automatic trunk selectors. The office selector takes one rotary step before engaging the first connected set.

*Operation of trunk selector.*—The trunk selector comprises a shaft 126 having one movement,—a rotary movement,—said shaft being provided with a stepping magnet 127. The shaft carries three brushes 128, 129, 130; the brushes 128, 129, being line brushes connected by conductors 131, 132, with the contact terminals 124, 125 of the selector, the armatures 133, 134, and back contacts of a relay 135 being included in said conductors 131, 132, respectively. The local trunk terminal 122 of the selector is connected with the conductor 137 which leads through the retaining magnet 138 of the trunk selector, contacts 139 closed by the selector shaft 126 when in normal position, winding 140 of relay 135 to earth, current being delivered to said conductor 137 from battery 67, when the brush 53 engages said contact 122 and the relay 73 has restored its armatures, as previously described, whereupon the relay 135 and retaining magnet 138 are operated.

The retaining magnet 138 in operating, attracts its armature and completes a locking circuit for itself independent of contacts 139 through its own armature, resistance 138ª and ground, the function of this resistance being to prevent the short-circuiting of relay 135. Relay 135 in operating attracts its armatures 133, 134, 141 and 147. The armatures 133, 134 when attracted, maintain the selector brushes 128, 129 dead during the selection. The armature 141 is connected with a conductor 142 which leads through the winding 143 of relay 135 to earth. Said armature 141 in its attracted position engages the contact spring 144, and separates the same from its normal contact 145, said spring 144 being connected with a conductor 146 leading to the local brush 130 upon the selector arm. The armature 147 is connected with a conductor 148 which leads to the battery contact of the pulsator 149, while the front contact of said armature is connected with conductor 150 leading through the winding of the stepping magnet 127 of the trunk selector to earth. Thus when relay 135 is operated, a circuit is completed by armature 147, by way of conductors 148, 150, said circuit including the magnet 127, which is operated to advance the test brush 130 on shaft 126 one step, to the terminals of a trunk line leading to the desired office. If this trunk line is busy, battery will be present at the local terminal 151 of such line, and current will flow through the local brush 130, conductor 146, spring 144 and armature 141, conductor 142, winding 143 of relay 135 to earth, maintaining the relay 135 energized. The stepping magnet 127 will thus continue to receive current and will advance the brush another step, and so on until an idle trunk line is reached whereupon current will not be present upon the terminal 151, and relay 135 will be deprived of current, releasing its armatures and restoring the continuity of the talking conductors 131, 132, which were broken during selection to prevent disturbances; opening at armature 147 the circuit of the stepping magnet 127; and breaking at armature 141 the connection of relay 135 with the local brush 130. Spring 145, which now rests in engagement with spring 144, is connected with a conductor 152 leading to conductor 137, which is connected with battery 67 at the office selector, and a potential is thereby applied by way of conductors 69, 123, 118, 137, 152, 146, to the contact terminal 151 of the trunk line upon which the selector brush 130 rests, to lock out other trunk selectors from the trunk line selected. The brushes 128, 129 of the trunk selector now rest upon the terminals of the limbs 152, 153, respectively, of a two-wire trunk line leading to the office B and the primary selector forming the terminal of such trunk line at the said distant office.

*Operation of translating machine and primary selector.*—As before stated, the line with which connection is desired, is numbered 1132. Therefore the operator depresses key I of the 1000's keys 154, key I of the 100's keys 155, key III of the 10's keys 156, and key II of the units keys 157. The 1000's and 100's keys control the operation of the translator shown at the left in Fig. 6, which operates the primary selector 136, Fig. 8, forming the terminal of the trunk line at the distant office to connect the trunk lines with an idle connector of the group containing the desired number. The shaft 159 of the translator is arranged to have two movements, one in long step under the control of stepping magnet 160, and the other in short step under the control of magnet 161. The shaft carries three brushes, the brush 162 being adapted to coöperate with the depressed 1000's and 100's keys, and the bank of contacts 163, to stop the shaft at the proper point to cause the brush 164 of the translator to apply battery to a particular contact of the primary controller 165, and cause the same to operate in series with the primary selector until the contact arm 166 of the primary controller reaches the contact to which battery has been applied by brush 164, and the primary selector reaches the group of trunks leading to the connectors of the group wherein is located the called party's line, at which time the primary controller and primary selector are stopped, and the primary selector caused to locate an idle connector. The third brush 167 of the translator is provided with a bank of contacts 168, which control the application of battery to a predetermined point upon the auxiliary controller 169, which is operated after the primary selector has located the connector to advance the brushes of such connector into the proper bank of its three banks of 100 lines each.

Describing now more in detail the operation of the translating mechanism and primary selectors: The relays 511 and 172, Fig. 7, control the starting of the translating mechanism, said relays being arranged to operate when the trunk selector has made connection with an idle trunk line leading to a distant station. Said relay 511 is included in a conductor 170 leading from the front contact of the armature 105 of the relay 106, through contact springs 171 controlled by the armature 173 of relay 172, to the feed wire 48, the connection of this conductor at armature 105 of relay 106 with wire 41 being completed when the sluggish relay 106 is operated after the impulse is applied to wire 44 to start the office selector in its upward hunt for an idle trunk selector. The circuit for relay 511 extends from the feed wire 48 through conductor 170 to conductor 41, thence through contacts 39, 42 of relay 31, to link conductor 8, over trunk wire 131 to the trunk selector, through the contacts closed thereby, to trunk wire 152 leading to the distant office, where the same passes through one winding of a repeating coil bridged across the trunk conductors to a conductor 174, which leads through the winding of relay 175, normally closed contacts 176, 177 of a polarized relay 178, normally closed contacts 179, 180, of said relay, normally closed contacts 181, 182 of relay 183, to trunk conductor 153, and thence to the primary selector, through the armature 184 and back contact of relay 185, to a conductor 186 which leads through contact springs 187 closed by the shaft of the selector while in normal position.

The relays 511 and 172 of the sending apparatus, Fig. 7, are sluggish in their operation to provide a time interval wherein the primary selector may get into condition for operation. This is accomplished under the control of the relay 175 associated with the trunk line at the distant office, which is in the circuit just traced for the relay 511. Said relay 175 in attracting its armature, completes a circuit for battery 189 by way of conductor 190 which leads through the normally closed contact springs 191, 192 of relay 193, winding of relay 193, winding of the retaining magnet 194 of the primary selector to earth, through the contact springs closed by the shaft 195 of the primary selector when in normal condition. The relay 193 and retaining magnet 194 are now energized and a locking circuit is completed for said relay and magnet independent of relay 175, said circuit extending from the free pole of grounded battery 196, conductor 188, through the contact springs 197, 198 of relay 183, armature 199 of relay 193 (which is now in engagement with the contact spring 191, separating the same from its normal contact 192, and disconnecting battery 189 from the circuit previously traced therefor) through the winding of the retaining magnet and its armature 200 and front contact to earth. The armature 201 of relay 193, which is connected with the portion of conductor 190 leading to the front contact of the armature of relay 175, in its attracted position opens the contact springs 202 which are normally included in the trunk conductor 152, and engages the member thereof which is connected with the portion of trunk conductor 152 leading directly to the primary selector, the contacts 202 being included in said conductor between the repeating coil and the selector.

The repeating coil serves to maintain the inductive continuity of the trunk circuit while maintaining the circuit broken for direct current. The two windings of the repeating coil connected with the portion of the trunk circuit leading back to the trunk selector are included in a bridge of said trunk conductor with a condenser, while the other two windings of the repeating coil which are included in the portion of the trunk circuit leading to the selector, are connected in a bridge of the trunk circuit with a grounded battery 203.

The retaining magnet 194 when energized as previously described, attracts its armature 204, completing a circuit from battery 205 by way of conductor 206, through the contact springs 207, 208 of relay 209, winding of relay 185 to earth, said relay thereupon attracting its armatures 210, 184, 211 and 212.

The armature 210 of relay 185, which with its back contact is normally included in the trunk conductor 152, when attracted engages a front contact connected with the conductor 213 leading through the stepping magnet 214 of the primary selector, contact springs 215 of relay 209 to earth. The magnet 214 is arranged to rotate the shaft 195 in 34 steps to pick out the group of trunk lines leading to connectors serving a particular group of 300 lines. The remaining armatures of the relay 185 bring into operative condition apparatus which will be hereinafter described.

The primary selector is now in condition for operation, and sluggish relay 511 of the sending apparatus, Fig. 7, has now operated to energize relay 172, which in turn causes the deënergization of relay 511, said relay 172 locking itself up, and the combination of relays 511 and 172, with the first-mentioned relay inert and the other energized, starts the translating mechanism. Relay 511 is provided with an armature 216 connected with the feed wire 48, said armature when attracted, completing a circuit for the relay 172. Relay 172, which is also sluggish, attracts its armature 173, opening the contacts 171, which are included in the circuit of the relay 511, and by means of said armature 173 and one of the members of the contacts 171, locking itself to earth from the feed wire. The armature 216 of relay 511, which is connected with the feed wire is provided with a back contact connected with a conductor 217 leading through the armature 218 and its front contact of relay 172, to the 1000's keys, and when armature 216 of relay 511 is retracted and armature 218 of relay 172 is attracted, current flows from the feed wire over the conductor 217, through the armature 219 and back contact of relay 220 to the 1000's keys 154, Fig. 6.

Each 1000's key, when operated, is arranged to be locked in its depressed position under the control of a release magnet 221, as described in connection with the office controller; each key when depressed forcing into electrical engagement contact springs 222, 223 and 224. Contact spring 222 is connected with the conductor 217 which is united by the feed wire 48 to the free pole of battery 27, and said spring in engaging its anvil 223 applies battery to a thousands contact terminal in the bank 163 over which the brush 162 of the translator sweeps. In the present case—calling line 1132—since key I is depressed, battery will be applied to the second thousands contact point 225 of the bank 163. It will be understood that the brush 162 normally rests one long step from the first terminal which would be "0", or the first thousands terminal. In the system shown, in order that the brush 162 may reach the second thousands contact point 225, it is arranged to take three long steps. Between the first and second thousands contact points there are ten intermediate contacts numbered from "0" to 9 inclusive; and the advance of the brush to any of said intermediate contacts is determined by the 100's keys.

The spring 224 of key I, which is in electrical engagement with springs 223, 222, and thereby with battery 27, is connected with a conductor 226 which extends from all the springs 224 of the 1000's keys, through the winding of relay 227, contact springs 228, associated therewith, to the ground contact of a pulsator 229; and when the ground spring of the pulsator engages said contact a circuit is completed for relay 227 which draws up its grounded armature 230, said armature engaging the member of springs 228 connected with the winding of relay 227 and completing a locking circuit for said relay independent of the pulsator.

The relay 227 is arranged to start the operation of stepping magnet 160 of the translator, said relay having an armature 231, which, when attracted, completes the continuity of a conductor 232 leading from the battery contact of a pulsator 233, through the winding of relay 234, armature 235 and back contact of relay 236 to the conductor 41, which is connected with the tip strand of the connecting circuit, and on through to the primary selector. It will be noted that the locking circuit for relay 227 is established by the pulsator 229 when in engagement with its ground contact, so that the circuit of conductor 232 will be completed before the pulsator 233 engages its battery contact, thus insuring a complete initial impulse over conductor 232.

When the battery spring of the pulsator 233 engages its contact, current flows over conductor 232 through the relay 234, over conductor 41, tip strand 8, trunk conductors 131, 152, through one winding of the repeating coil to conductor 174, thence through relay 175, contacts of relays 178, and 183, to trunk conductor 153, through the armature 184, and front contact of relay 185, to conductor 237, through contacts 238 of relay 209 to earth through the winding of said relay, this current being without effect upon said relay 209. Relay 175 in the circuit just traced, responds to said current, and in attracting its armature applies current from battery 189 to conductor 190, and thence through armature 201 and one of the members of springs 202 of relay 198, to trunk conductor 152, thence through armature 210 and its front contact of relay 185, conductor 213, rotary stepping magnet 214 of the shaft 195, contact springs 215 of relay 209 to earth, whereupon the stepping magnet 214 is operated to rotate the shaft 195 one step. This advance of the primary selector is simply to save time in the operation of the system.

The relay 234 in the circuit traced from the pulsator 233 responds to the pulsations and applies current from battery 239 through the armature 240 and its front contact of said relay 234, to the long step magnet 160 of the translator, which advances the brushes of the translator in long steps. The relay 234 has an armature 241 also connected with battery 239, said armature when attracted applying current from said battery to a conductor 242 which leads to earth through the stepping magnet 243 of the primary controller 165 to advance the arm 166 thereof. It will thus be seen that the translator arm, the contact arm of the primary controller, and the arm of the primary selector, advance together until the brush 162 of the translator reaches the thousands point 225 of the bank 163 of contacts, at which time each of said arms will have taken three steps—the translator arm three long steps and the primary controller and primary selector arms three short steps each. The holding or retaining magnets of the translator and primary controller are permanently connected with the feed wire and were operated the instant relay 26 applied battery to the feed wire, when the sending apparatus was taken by the connecting circuit for use.

When the brush 162 of the translator reaches the contact 225 it finds current thereon, and said current passes through the brush 162 to a conductor 244, which leads through the armature 245 and back contact of relay 220, through the winding 246 of relay 236 to earth, operating said relay 236, which opens at its armature 235 and back contact the conductor 282 and the circuit before traced, including the relay 234, pulsator 233, and the relay 175 at the primary selector, so stopping the movement of the arms of the translator, primary controller and primary selector.

The translator is now ready to respond to the control of the 100's keys and seek the intermediate point beyond the contact 225 where it is desired to finally stop the translator. In the present case, since key I of the 100's keys is depressed, the second intermediate point beyond point 225 would be supplied with battery in the following manner: Relay 236 when energized, as above described, attracts its armature 247, which is connected with a conductor 248 leading through the relay 220 to the feed wire 48. The front contact of armature 247 is connected through a winding of relay 236 to earth; and when said armature 247 is attracted, a circuit is completed for the relay 220 which attracts its armature 219, 245. Armature 219 when attracted connects conductor 217 and battery 27 with conductor 249 leading to the springs 250 of the 100's key 155. The armature 245 of relay 220 in its attractive movement connects conductor 244 leading from brush 162 with a conductor 251 leading through the winding of the relay 252 to earth. Brush 162 is now dead, since battery is removed by armature 219 of relay 220 from the thousands keys and so from contact 225. The three springs of key I of the 100's keys are now in electrical connection (key I being locked in its depressed position under the control of a release magnet 428) and the middle spring 512 applies battery from spring 250, conductors 249, 217, to the second intermediate contact beyond point 225. The third spring 253 applies current by way of the springs 250, 512 and conductors 249, 217, to conductor 254 leading through winding of relay 255, to earth; said relay 255 in attracting its armature completing the continuity of a circuit 513 which extends from the battery contact of a pulsator 257, through the winding of the short step magnet 161 of the translator, through the armature 258 and back contact of relay 252 to earth. The pulsator 257 applies current through the circuit just traced to operate the stepping magnet 161 and advance the shaft in two short steps, until the brush 162 of the translator rests upon the second intermediate point beyond a contact 225, at which time current will flow by way of brush 162 and conductor 244, through the armature 245 and front contact of relay 220, conductor 251, to earth through relay 252, which will attract its armature 258 and open the circuit of the pulsator 257 and the stepping magnet 161 of the translator, leaving the shaft of the translator three long steps and two short steps from its normal position.

*Primary controller.*—The primary controller in an exchange such as I am describing, where the lines are arranged in groups of 300, would have thirty-four contact points, each point representing a "group" contact point of a primary selector, which in like manner would have thirty-four rotary steps to engage thirty-four terminals. From each terminal of the primary controller a conductor runs to three contact points strapped together, over which the second brush 164 of the translator is arranged to sweep, said brush being adapted after the translator has been brought to a predetermined point under the control of the 1000's and 100's keys, to apply battery to a certain group of strapped contacts to stop the controller and selector when the selector is advanced to the group of trunk lines leading to the connectors serving the group of lines in which the called party's line is located.

The operation of the primary controller and selector is automatically effected immediately upon the completion of the movement of the translator. The relay 252, which was operated the instant the translator brush 162 landed on the second intermediate point, in attracting its armature 262, applied current from the positive battery 263 to conductor 264 leading to the brush 164, which now rests upon the set of strapped contacts connected with the fourth contact 265 in the bank of contacts of the primary controller. It should be remembered at this point that the primary controller and primary selector followed the long steps of the translator brush, so that the arm 166 of the primary controller and the brushes on the shaft 195 of the primary selector now rest on their third "group" terminals. This arrangement is simply to save time in setting up the connection.

The armature 266 of relay 252, which was operated when the translator completed its movement, serves to start the primary controller and selector, said armature 266 being connected with a ground contact of the pulsator 267, the front contact of said armature being connected with a conductor 268 leading through contacts 269 and the relay 270 to the feed wire 48. The instant the ground spring of the pulsator 267 engages its contact, a circuit is completed from battery 27 over the feed wire 48, conductor 268, through relay 270, armature 266 and front contact of relay 252, to earth; and the relay 270 in operating attracts its armature 271, which separates springs 269, engaging one of such springs to complete a locking circuit of such relay 270, from the feed wire independent of the pulsator.

An armature 272 is provided for relay 270, which is connected with the battery contact of a pulsator 273, the front contact of armature 272 being connected with a conductor 274 leading through a relay 275, armature 276 and back contact of relay 277, to conductor 41, which leads to the tip strand 8. Relay 275 controls a circuit from battery 278 through the stepping magnet 243 of the controller. The pulsator 273 applies current through the relay 275 and out over conductor 41, tip strand 8, trunk conductors 131, 152, to the distant office, and thence through conductor 174, relay 175, contacts 181, 182 of relay 183 to trunk conductor 153, thence through conductor 237, and relay 200, to earth, this current, however, not affecting the relay 209. The relay 175 responds to the impulses in the circuit traced and completes a circuit from battery 189 over conductor 100, armature 201 of relay 193, and one of the springs 202 to the trunk conductor 152, thence through the armature 210 of relay 185, conductor 213, stepping magnet 214 of the primary selector, contacts 215 of relay 209 to earth. The relay 275 associated with the primary controller and included in the circuit of pulsator 273 above traced makes and breaks the circuit of the stepping magnet 243 of the controller. The stepping magnets 243 of the controller and 214 of the selector now rotate their respective arms until the contact arm 166 of the controller reaches the fourth contact in its path, which is connected by the brush 164 and conductor 264 with positive grounded battery 263, at which point current flows from said battery through the arm 166 of the controller and the conductor 269, leading from said arm through a winding of relay 277, to earth. Relay 277 now operates and attracts its armature 276, opening the circuit from the pulsator 273 through the relay 275 of the primary controller and the relay 175 at the distant station, said relay 175 controlling the circuit through the stepping magnet 214 of the primary selector. Said relay 277 also draws up its armature 280, completing a locking circuit for itself which extends from the feed wire 48 through sluggish relay 281, winding of relay 277 to earth. The brushes on the shaft 195 of the primary selector have now reached the fourth group of trunk lines, which lead to connectors adapted to reach the line with which conversation is desired.

*Automatic selection of idle trunk by selector.*—The attraction of armature 276ᵃ of relay 277 completed the continuity of a conductor 282 which leads from the conductor 269 between the brush 166 and relay 277, through the armature 276ᵃ and front contact of relay 277, armature 283 and back contact of sluggish relay 281, to conductor 44, and before the sluggish relay 281 has had time to operate, an impulse from positive battery 263 flows by way of conductor 264, brush 164, contact arm 166, and its fourth terminal, conductors 269, and 282, conductor 44, to the ring strand 9 of the connecting circuit, trunk conductors 132, 153, through a lower winding of the repeating coil, to conductor 284, which leads through the contact springs 285, 286, winding of the polarized relay 178 to earth. Said positive current causes the relay 178 to tilt its armature in a contra-clockwise direction, whereupon spring 177 of said relay is separated from its anvil 176 and thrown into engagement with a contact 287 connected with the free pole of grounded battery 288; current thereupon flowing from battery 288 through the springs 287, 177, conductor 174, contacts 181, 182 of relay 183, trunk conductor 153, armature 184 and front contact of relay 185, conductor 287, springs 238 of relay 209, and winding of said relay to earth. Relay 209 is now energized and draws up its armatures 289, 290, 291. The armature 290 is connected with conductor 206 which leads from the battery 205; and said armature when attracted separates springs 238, engaging the member thereof leading directly to earth through the relay 209 and completing a locking circuit for said relay independent of relay 178, which by this time has been deprived of current, owing to the operation of the sluggish relay 281. Armature 291 of relay 209 is connected with a conductor 292 leading through the lifting magnet 293 of the primary selector, armature 212 and front contact of relay 185 to the battery contact of a pulsator 294. And said armature 291 when attracted is adapted to separate springs 215, breaking the continuity of conductor 213 connecting the rotary stepping magnet 214 with trunk conductor 152, and to engage the grounded contact spring of said pair of springs 215 to complete a circuit for the lifting magnet 293 and the pulsator 294. Said magnet 293 is adapted to step the shaft 195 up in search of a trunk line leading to an idle connector adapted to serve the fourth group of three hundred lines in which the line desired, number 1132, is to be found.

The armature 289 of relay 209 is connected with a conductor 296 leading through the armature 211 and front contact of relay 185 to the local brush 297 of the primary selector; said armature 289 when attracted is adapted to separate springs 207, 208 included in the circuit from battery 205, with relay 185, and to engage the spring 208, which leads directly to earth through relay 185, thereby connecting said relay 185 through its own armature 211 and front contact with said local brush 297. Now when the selector has been given one upward movement to bring its brushes into engagement with the terminals of a trunk line leading to the first connector of the fourth group, if that connector is busy, the local brush 297 of the trunk line leading to said connector will have potential thereon from the local terminal 298 of such trunk, and current will flow through the local brush 297, conductor 296, armature 211 and front contact of relay 185, winding of relay 185 to earth, maintaining relay 185 energized. Relay 185 in turn will maintain the circuit of the up-stepping magnet 293 intact, and the said magnet 293 will lift the shaft 195 another step, and so on until a trunk line leading to an idle connector is reached, when no current will be found upon the local terminal 298 of such line, and relay 185 will be deprived of current, releasing its armatures. The armatures 210, 184 in retracting restore the continuity of the trunk conductors 152, 153; the armature 212 opens the circuit of the up-stepping magnet 293, and the armature 211 opens the connection of relay 185 with the local brush 297, and engages its back contact connected with a conductor 299 which leads through armature 204 and front contacts of the retaining magnet 194, to the free pole of battery 205, thereby placing by way of local brush 297 a test potential upon the multiples of the local trunk terminal 298. The line brushes of the shaft 195, which form the terminals of trunk conductors 152, 153, are now in engagement with terminals of the trunk line leading to an idle connector adapted to reach line 1132, said brushes engaging terminals connected with conductors 300, 301, respectively, while the local brush 297, which is connected with the free pole of battery 205, applies battery by way of terminal 298, to the local trunk conductor 302 which leads through the contact springs 303, 304 of a busy test and lock out relay 305 of the selected connector, Fig. 4, through the winding of the retaining magnet 306 of the connector, contact springs closed by the shaft of the connector when in its normal position, to earth. The retaining magnet 306 thereupon attracts its armatures 307ᵃ, 308, armature 307 completing a locking circuit for the retaining magnet 306, independent of the springs which are separated while the connector shaft is away from normal position.

If the line with which connection is to be established had been a line terminating in the office where the call originated, it is apparent that no inter-office trunk would be needed in establishing the connection. Instead the trunk selector would pick out a trunk line in the local office leading to a primary selector in such office, which would select a connector adapted to reach the line desired. In Fig. 11, we have shown such trunk line and selector. The trunk selector, Fig. 2, would be operated to bring its brushes 128, 129, and 130 into engagement with the terminals of an idle three-wire trunk, comprising conductors 514, 515 and 516 leading to the primary selector 517 in exchange A. After the trunk selector had completed connection with the three-wire trunk, current would be applied from the local battery 67 of the office selector to the brush 130 of the trunk selector, and to the local wire 516 of the three-wire trunk, said conductor 516 leading directly through the retaining magnet 518 of the primary selector, contact springs closed by the shaft of the selector when in normal position, to earth, said retaining magnet attracting its armature 519 to complete a locking circuit for itself independent of said contact springs. The armature 520 of the retaining magnet is connected with the free pole of a grounded battery, and is adapted in its attractive movement to engage a contact connected with a conductor 521 leading through contact springs 522 of a relay 523, winding of a relay 524, to earth. The relay 524 is now operated, and attracts its armatures 525, 526, 527 and 528. The armature 525 and back contact of the relay 524 are normally included in the trunk conductor 514, and said armature when attracted is adapted to engage a contact connected with a conductor 529 which leads through the rotary stepping magnet 530 of the primary selector, contact springs 531 controlled by relay 523, to earth. The armature 526 of said relay 524, which, with its back contact, is normally included in the trunk conductor 515, is adapted when attracted to engage a front contact connected with a conductor 532 which leads through the normally closed contact springs 533 of relay 523, and the winding of said relay to earth. The armatures 527, 528 bring into operative condition apparatus to be described hereafter. The primary selector is now in condition for operation by the translating mechanism, and the starting relay 511 of the translating mechanism is operated by current in the circuit leading through the stepping magnet 530 of the selector to earth, such current being without effect upon said magnet. It should be stated at this point that the primary selector under consideration is very similar to the primary selector associated with the two-wire trunk, that is, it is provided with a shaft adapted to be stepped around to pick out a group of trunk lines leading to connectors adapted to reach a given group of 300 subscribers. Said shaft is then arranged to step upwardly to pick out an idle trunk line of the group leading to a connector.

When the starting mechanism is operated, and its brush 162 is seeking the terminal which has been supplied with battery by the thousands key, impulses are sent over the trunk conductor 514, to give the brushes of the selector a number of rotary steps corresponding to the long steps of the translator, as described in connection with the two-wire trunk and its selector, and when the translator has stopped, the primary controller operates, and impulses are again delivered to the trunk conductor 514 to continue the rotary movement of the selector to the desired group of trunk line terminals. At this point an impulse is delivered over the trunk conductor 515 from the positive battery 263 to operate the relay 523, which draws up its armatures 534, 535 and 536. The armature 535 is connected with conductor 521, and in its attractive movement separates the springs 533, engaging the member thereof connected with relay 523 to complete a locking circuit for relay 523 from the conductor 521 and local battery. The armature 534 of relay 523 separates springs 522 and engages the member thereof connected directly to earth through relay 524, so connecting said relay through its own armature 527 and front contact with the local brush of the selector. The armature 536 of said relay 523 in its attractive movement separates springs 531 to disconnect the stepping magnet 530 from the trunk conductor 514, said armature engaging the member of springs 531 connected directly to earth and so completing through the armature 528 and front contact of the relay 524, a circuit from a pulsator 537, through a stepping magnet 538, which is adapted to move the shaft of the selector upwardly. The magnet 538 now gives the selector brushes an upward step to the terminals of the first trunk line of the selected group leading to the connector adapted to reach the desired line, and if such trunk line is busy, battery will be present upon the local terminal thereof, and current will flow through the local brush of the selector, armature 527 and front contact of relay 524, armature 534 and front contact of relay 523, through the winding of relay 524, maintaining said relay 524 energized, which in turn maintains intact the circuit of the stepping magnet 538, said magnet 538 thereupon lifting the brushes another step to the terminal of the next trunk line, and so on until an idle trunk line is reached. When an idle trunk line is reached, current is removed from relay 524, which releases its armatures, opening the circuit of stepping magnet 538 and applying current to the local brush of the selector, as described in connection with the primary selector of the two wire trunk.

*The auxiliary controller.*—After the primary selector has selected an idle connector, the third brush 167, Fig. 6, of the translator and mechanism associated therewith, is arranged to operate the connector to move the brushes thereof into the zone or bank of contacts in which is located the terminals of the called party's line. To this end, in calling line 1132, the auxiliary controller 169 is arranged to coöperate with the brush 167 of the translator to move the brushes of the connector into association with the third bank of contacts, in which is located the terminals of line No. 1132 with which connection is to be established. A conductor 311 leads from the wire 269, which is now supplied with current from positive battery 263 by way of the primary controller, to the brush 167 of the translator which now rests upon a second intermediate contact 310 beyond the second ten's contact of the set or bank contacts 168, over which the brush 167 sweeps, said second intermediate contact being connected with a conductor 312 which leads to the last contact terminal 313 upon the auxiliary controller 169, said contact 313 being included in a bank of contacts adapted to be engaged by the contact arm 314 of the controller.

The intermediate contact points of the bank 168 are divided into groups of three; the first contact of each group, representing the first zone of a connector, being dead; the second contact, representing the second zone, being connected with conductor 312ᵃ to apply battery to the tenth point of the controller, while the third contact of each group, representing the third zone of a connector is connected with a conductor 312 leading to the twentieth contact of the controller. The auxiliary controller has twenty contacts in its bank, and the contact arm 314 is arranged to be moved with the connector brushes to place said connector brushes into operative connection with the proper bank of contacts. Thus if the line wanted were in the first bank of contacts, the auxiliary controller would not operate, since the connector brushes are normally in operative relation to said first bank and the brush 167 would rest upon a dead contact. However, if the line desired were in the second bank of contacts, potential would be applied by the translator brush 167 to the tenth contact of the auxiliary controller, and the controller arm would advance with the connector brushes ten steps, when both would be stopped, leaving the connector brushes in operative relation to the second bank. In the present case, in calling line 1132, the twentieth contact 313 would have potential applied thereto by the translator brush 167, and the controller arm and connector brushes would be advanced until the controller arm reached point 313, and the connector brushes were placed in operative relation to the third bank of contacts, when both would be stopped.

Sluggish relay 281 associated with the primary controller, whose circuit was completed by the armature 280 of relay 277 after the primary controller and primary selector had completed their operation, in operating applies current from negative battery 315 through the armature 316, and front contact of relay 281, through conductor 319, and thence through the winding of relay 317, contact springs 318 thereof, to conductor 41. The circuit of this relay is not completed until the connector selected by the primary selector is in condition for operation, the circuit extending over conductor 41 to the tip strand 8 and thence over trunk conductors 131, 152, through conductor 174, winding of relay 175, to trunk conductor 153, and thence over the conductor 301 to the connector, through springs 320, 321 of a connecting relay 323, to conductor 324, which leads through a resistance 325 to earth through the armature 308 and front contact of the retaining magnet 306, which is now energized. Current in the circuit just traced energizes relay 175, which attracts its armature, applying current from the free pole of battery 189 over conductor 190, through the armature 201 and one of springs 202 of relay 193 to trunk conductor 130, 152, thence through the primary selector, line conductor 300, normally closed contact springs 326, 327 of relay 328, to conductor 329, which leads through the contact springs 330 of a transfer relay 331, rotary stepping magnet 332, to conductor 324, and thence to earth through armature 308, said stepping magnet 332 being energized to give the shaft of the connector an idle movement, which is simply incidental to the operation.

Returning to the auxiliary controller, Fig. 6, relay 317 is now operated by current from battery 315 in the circuit above traced, and attracts its armature 333 which locks relay 317 to earth in a circuit from battery 315 independent of the connector. Relay 317 also attracts its armature 334, which applies current from the positive battery 335 to conductor 336, which leads to the armature 337 of relay 338. Said relay 338 has two windings, one included in a grounded conductor connected with the conductor 312, and the other in a grounded conductor connected with the conductor 312ª, said relay thereby receiving current from the brush 167, when the same rests on either the second or the third contact of a group. In the present case, the brush 167 is resting upon the second intermediate contact past the second 10's point or the third of a group, and current from battery 263 flows by way of conductor 264, brush 164, fourth group of strapped contacts to the fourth contact 265 upon the primary controller, thence by way of arm 166 of the controller, conductors 269 and 311 to the brush 167 of the translator, thence by way of conductor 312, winding of relay 338 to ground. Relay 338 thereupon attracts its armature, connecting conductor 336 with conductor 339 which leads through the winding of relay 340, contact springs 341 thereof, to the ground contact of a pulsator 342. And when the ground spring of the pulsator 342 engages such contact, a circuit is completed through relay 340, which attracts its armature 343, separating springs 341 and completing a locking circuit for relay 340 from battery 335, independent of the pulsator 342.

The armature 345 of the relay 340 is connected with conductor 41, while the front contact of said armature is connected with a conductor 346 leading through the armature 347 and back contact of the relay 348, winding of the relay 349, to the battery contact of pulsator 342. Current from the pulsator flows through relay 349, to common wire 41, and thence over strand 8, line conductors 131, 152, conductor 174, relay 175 trunk conductor 153, through the selector contacts and over the line conductor 301 to the connector, where the same passes by way of conductor 324 to earth through the armature of the retaining magnet. Relay 175 in said circuit at the selector is now energized, and applies current from battery 189 over conductor 190, and the trunk conductor 152 through the primary selector and line conductor 300, conductor 329 and rotary stepping magnet 332 and conductor 324 to earth. The connector shaft is accordingly rotated to locate the bank of contacts in which the called party's line terminates. Relay 349 of the auxiliary controller which is in the circuit traced from the pulsator 342, responds to said pulsating current and makes and breaks a circuit from battery 350 through the stepping magnet 351, of the auxiliary controller, advancing the controller arm with the shaft. When the contact arm 314 reaches the contact terminal 313, to which potential is applied by the brush 167, and the brushes on the connector shaft have advanced to a position one step removed from the third bank of contacts, current flows from battery 263 through the brush 167 of the translator, conductor 312, through the arm 314 of the auxiliary controller, to earth, by way of a conductor 353 which includes the winding of relay 348. Said relay is thereupon energized and attracts its armature 347, breaking the circuit of the pulsator 342, relay 349 of the auxiliary controller, and the relay 175 associated with the primary selector which controls the circuit through the rotary magnet 332 of the connector.

The back contact of armature 337 of relay 338 is connected with a conductor 354 leading to the tens and units keys. It will be understood that when the line desired terminates in the first bank of 100 lines of a connector, the brush 167 after the translator has been operated rests upon a dead contact, and relay 338 does not receive current, so that current from battery 335 is applied directly to the tens and units controller, since the services of the auxiliary controller in such event would not be required. In the present case, however, the line desired is in the third bank of contacts, and during the operation of the auxiliary controller, current is removed from conductor 354, since the armature 337 of relay 338 is attracted, but when the relay 348 operates, after the connector has been advanced to the proper bank of terminals, current is applied by the armature 355 of relay 348 from wire 353 and battery 263, to a conductor 356 connected with conductor 354, and current flows over conductor 354 through the armature 356ª and back contact of relay 357, Fig. 5, to the springs 358 of the tens keys 156 of the tens and units controller.

*Tens and units controller.*—The tens and units controller is arranged to be set by the operator to be automatically brought into service after the connector has been driven around until its brushes rest one step from the first vertical row of line terminals of the selected bank. In each bank of one hundred lines there are ten vertical rows of ten lines each, and the depressed tens key 156 controls the advance of the connector brushes around to the vertical row which contains the terminal of the line desired, at which time the depressed units key 157 is brought into service to operate mechanism adapted to step the connector brushes up to the desired line terminal.

In calling the line 1132, as before stated, the key III of the tens keys and the key II of the units keys were operated, said keys remaining in their depressed positions under the control of release magnets 359, 360, respectively. The controller is provided with a bank of contacts provided with tens terminals between which are located intermediate terminals or units terminals, and the brush 361 carried by shaft 362 is arranged to sweep over said terminals; the shaft being advanced in long steps between the tens terminals by a long step magnet 363, and over the intermediate terminals in short steps by magnet 364. A retaining magnet is provided for the shaft 362 receiving current from the feed wire 48, as referred to hereinbefore.

*Operation of mechanism controlled by tens keys.*—In calling line 1132, key III of the tens keys was depressed and when battery is applied to springs 358, as previously described, said spring 358 of key III in engaging spring 365 applies current from battery 263 to the fourth tens terminal of the bank. Spring 365, in engaging its contact 366, applies current from battery 263, to conductor 367, which leads through the winding of relay 368 and contact springs associated with said relay to the ground contact of pulsator 369, and when the ground spring of said pulsator engages its contact, a circuit is completed for relay 368 which draws up its armatures, armature 370 completing a locking circuit for said relay independent of the pulsator. The armature 371 of said relay in its attracted position completes the continuity of a conductor 372 leading from the battery contact of the pulsator 373, through relay 374, armature 375, and back contact of a relay 376, to a common wire 41, and current flows from pulsator 373 over conductors 372, 41, 8, 131, 152, 174, 153, 301, 324 to earth, this circuit including relay 175, which applies current to the rotary stepping magnet 332 of the connector in the circuit formed by conductors 190, 152, 300, 329, 324, said stepping magnet responding to the pulsations and moving the brushes of the connector past the vertical rows of terminals of the connector in the selected bank. Relay 374 in the circuit traced from pulsator 373, makes and breaks a circuit 376ª for the long step magnet 363 of the tens and units controller, which advances the shaft 362 carrying brush 361 in long steps over its bank of contacts. When the brush 361 reaches the fourth tens terminal and the connector brushes have been given four steps and lie below the vertical row of contacts containing the terminals of line 1132, the current which has been applied to the fourth tens terminal of the controller by the depressed tens key III flows over the brush 361, conductor 377 connected therewith, through the armature 378 and back contact of sluggish relay 357, winding 379 of relay 376 to earth. Relay 376 is now operated and attracts its armatures, the armature 375 opening the circuit of the pulsator including the relay 374 of the controller, and the relay 175 of the primary selector which controls the circuit of the rotary magnet of the connector. The armature 380 of relay 376 in its attracted movement completes a locking circuit for the relay 376, said circuit extending from the feed wire 48 through conductor 381, sluggish relay 357, and a winding of relay 376 to earth.

The armature 382 of the relay 376 in its attracted movement completes the continuity of the conductor 383 leading from the wire 377, which is connected with the battery through the brush 361, through armature 384 and its back contact of relay 357, to the common wire 44. And before the sluggish relay 357 has had time to operate an impulse of positive current is applied to the common wire 44, said current flowing from the free pole of grounded positive battery 263, conductors 264, 269, 311, 312, 353, 356, 354, armature 356ª, and back contact of relay 357, through springs 358, 365 of the tens key III, brush 361 of the tens and units controller, conductors 377, 383, armature 382 and front contact of relay 376, and armature 384 and back contact of relay 357, to common wire 44, thence over the line conductors 9, 132, 153, to the distant office, thence over the local wire 284, contact springs 285, 286, of relay 183, through the winding of polarized relay 178 to earth. Said relay thereupon tilts its armature in a contra-clockwise direction, applying current from battery 288, through the springs 287, 177, conductor 174, to the line conductor 153, thence through the primary selector to line conductor 301 and connector, conductor 324, to conductor 387 which leads through contact springs 385, of relay 331, winding of said relay, contact springs 386, of the relay 323, to conductor 324 and earth. The transfer relay 331 is now operated to bring the lifting magnet 388 of the connector into connection with the line conductor 300. The armature 389 of said transfer relay when attracted locks the relay 331 in a circuit from conductor 302, which is connected with the battery 205, conductor 387, 324, to ground. The armature 389ᵃ of the transfer relay is connected with a conductor 390 which leads through the armature and back contact of a relay 391, winding of the lifting magnet 388 to conductors 387 and 324 and earth. Said armature 389ᵃ when attracted separates contact springs 330, engaging the member thereof connected through conductor 329 and contact springs 326, 327 of relay 328 with line conductor 300. The stepping magnet 388 is now in condition to receive impulses to move the shaft upwardly.

*Operation of mechanism controlled by units keys.*—The sluggish relay 357 above referred to has now been operated, attracting its armatures 384, 356ᵃ, and 378. The armature 356ᵃ, which at this time is connected with positive battery 263, in engaging its front contact applies battery to conductor 392 leading to the main springs 393 of the units keys. Since the key II of the units keys 157 is depressed, its contact spring 393 will rest in electrical engagement with springs 394 and 395, spring 394 being connected with a conductor leading to the third intermediate terminal past the fourth tens terminal of the controller bank of contacts, such terminal corresponding to the number thirty-two. The spring 395 will apply current from the conductor 392 to the conductor 396 which extends through the winding of relay 397, contact springs associated therewith, to the ground contact of a pulsator 398; and when the ground spring of the pulsator engages said ground contact a circuit will be completed for relay 397, which, in attracting its armature 399, completes a locking circuit for itself independent of the pulsator. Said relay also attracts the armature 400, which completes the continuity of a conductor 401 leading from the battery contact of a pulsator 402, through the winding of a relay 403, armature 404, and back contact of the relay 33, to common wire 41, and as the battery spring of the pulsator 402 intermittently engages its contact, pulsating current will flow over the conductor 401 including relay 403, conductors 41, 8, 131, 152, 174 including relay 175, conductors 153, 301, 324, to earth. Relay 175 will respond to the pulsations in said circuit and apply pulsations from battery 180 by way of conductors 190, 152, 300, 329, 390, 387, 324 to earth, said circuit including the lifting magnet 388 of the connector which gives the shaft of the connector its upward movement.

The relay 403 in the circuit of the pulsator 402 intermittently makes and breaks a circuit 406 for the short-step magnet 364 of the tens and units controller, said magnet 364, thereupon advancing the shaft 362 and brush 361 in short steps over the intermediate terminals. When the brush 361 reaches the third intermediate terminal corresponding to units key number II, and the connector brushes have been lifted to the terminal of line number 1132, current from battery 263 will flow by way of conductors 264, 269, 311, 312, 353, 356, 354, 392, brush 361 of the tens and units controller, conductor 377, to the armature 378 of relay 357, whose front contact is connected with a conductor 407 leading to earth through the winding 408 of the relay 33, which relay thereupon is energized and attracts its armature 404, opening the circuit of the pulsator 402 before traced, including relay 403, and the relay 175 at the distant office which controls the circuit of the lifting magnet of the connector. The shaft of the connector now rests with its brushes in engagement with the terminals of line 1132. The armature 32 of said relay 33 in its attractive movement opens the locking circuit including the relay 26 (which applies current from battery 27 to the feed wire 48) and also relay 31, which in releasing its armatures 39, 40, restores the continuity of the link conductors 8, 9, disconnecting therefrom conductors 41, 44 respectively. The armature 405 of the relay 33 is connected with the feed wire 48, the front contact of said armature being connected to earth through a winding of relay 33 and with a conductor 409, which leads to the front contact of armature 384 of relay 357, said armature 384 being connected with the wire 44. An impulse of negative current from battery 27 is now applied over conductors 48, 409, 383, before the armatures of relays 26 and 31 have been released, said impulse passing over conductors 44, 9, 132, 153, 284, through the polarized relay 178 to earth, and when relay 31 has become inert the supply of negative current is continued to the relay 178 from the battery 12 in the cord circuit by way of link conductor 9, including armature 504, and normal contacts 46, 45 of relay 31, conductors 132, 153, 284, normal contacts 285, 286 of relay 183 to relay 178 and ground which remains energized over the circuit thus established. Relay 178 in responding to said negative current tilts its armature in a clockwise direction, and applies current from grounded battery 411 through the springs 412, 180, to conductor 174, and line conductors 153, 301, for the purpose of the busy test to be hereinafter explained. Said armature also closes contact springs 413, 414, applying current from battery 411 to a conductor 415 which leads through a high resistance winding 416 of relay 417, to conductor 174, current from battery 411 finding a path through the winding 416 by way of conductor 174 and line conductors 152, 131, and 8, through the repeating coil associated with the operator's connecting circuit to the grounded pole of battery 12.

Relay 417 is provided with an armature 418 which, when attracted, completes a circuit from the free pole of battery 196, through the winding of relay 183, conductor 419, to earth; said relay 183 thereupon attracting its armatures 420, 421, 422. The armature 422 is adapted when attracted to separate springs 285, 286, and break the connection of polarized relay 178 with the trunk conductor 153. Said armature is connected with a conductor 423 which leads to the conductor 415, and when said armature is attracted, it engages the contact spring 285, and includes the winding 416 of the relay 417 in a bridge around the condenser which is included between two windings of the repeating coil, said bridge including conductors 174, 415, winding 416 of said relay 417, conductor 423, armature 422 and contact spring 285 of relay 183, and conductor 284. The winding 416 of relay 417 now receives current in metallic circuit from the battery 12 included in the bridge of the operator's connecting circuit.

The armature 420 of relay 183 when attracted separates the springs 181, 182, engaging spring 182 to complete the continuity of the portion of trunk conductor 153 between the repeating coil and the primary selector; while the armature 421 in its attracted movement separates springs 197, 198, opening the circuit of relay 193, which releases its armatures 201, 199, armature 201, permitting the reëngagement of springs 202 to complete the continuity of the portion of the trunk conductor 152 extending between the repeating coil and selector, and armature 199 opening at another point the circuit of relay 193. The said armature 421 of relay 183 is adapted when attracted to engage the spring 197, and apply battery 196 to the local wire 190 containing the retaining magnet of the selector, independently of the relay 193, which is now deënergized. It should be noted at this point that the resistance of the winding 416 of relay 417 in the metallic circuit with the battery 12 at the connecting circuit is too great to permit the operation of the supervisory relay representing the called line, which accordingly remains inert, maintaining the supervisory signal representing the called line, displayed.

*Restoration of sending apparatus.*—The relay 26 shortly after the impulse passed from battery 27 over the conductor 44 to operate the relay 417, became deënergized, and retracted its armatures 47, 424, the armature 47 in its retractive movement breaking the connection of battery 27 with the feed wire 48, thereby opening the circuits of the holding magnets of the controllers and translating mechanism, permitting the restoration of the arms thereof to normal position. The armature 424 of said relay is connected with the free pole of battery 27 and is adapted during its retractive movement to momentarily make electrical contact with both members of a pair of contacts 426, one member whereof is connected with a conductor 427 leading in multiple branches through the release magnets 80, 221, 428, 359, and 360, respectively of the office, thousands, hundreds, tens and units keys respectively, whereupon the latch bars of said keys are operated and the depressed keys restored to normal position. Current is now removed from all the mechanism of the sending apparatus and the lamp 49 is extinguished, indicating to the operator that the sending apparatus may be taken for use with another connecting circuit if desired.

*Test of the called line.*—When the polarized relay 178 associated with the primary selector received its impulse of negative current, as above described, it applied current from battery 411, through contact springs 412, 180, conductor 174, contacts 181, 182 of relay 183, before said relay was operated by relay 417, said current passing thence over the line conductors 153, 301, conductor 324 through contact springs 429, closed at the first upward movement of the connector, conductor 430, winding of relay 431, conductors 329, and 324 to ground. The resistance 325 is provided in order to prevent the grounded armature of relay 306 from short-circuiting the transfer relay 331 and to keep relay 431 out of circuit when the impulse is transmitted over the line conductor 301 to operate the transfer relay 331, while still affording a path to ground through relay 175, from the sending apparatus.

The relay 431 responds to the impulse above referred to, and attracts its armature 432, completing the continuity of a test conductor 433, leading from the local brush 434 upon the connector shaft, through the connecting relay 323, and relay 391 to conductors 430, 329, 324 and earth.

The telephone line 1132 is shown, Fig. 8, leading in two limbs to its line terminals upon the connector, Fig. 4, its local terminal being connected in multiple to other local terminals representing the said line on other connectors, and to the test thimble of an answering jack and thence to earth through a battery. Now, in case the line is made busy either at the answering jack of such line, or at a connector making connection with said line, a shunt will be established around the test conductor 433 of another connector attempting to make connection with such line, and the relay 323 will not receive sufficient current for its operation. If, therefore, the line with which connection is desired is busy, after the relay 431 is operated to attract its armatures 432 and 435, and relay 323 fails to respond, current will be applied from a pulsator 436 by way of conductor 437, contact springs 438 controlled by relay 323, through an armature and back contact of relay 391, armature 435 and front contact of relay 431, to earth, through the winding of the busy test and lock-out relay 305, which is sluggish, to provide a time interval wherein the relay 323 may respond if the line is free.

The armature 439 of the relay 305 is connected with the conductor 437, and in its attractive movement separates springs 303, 304, to break the circuit of the retaining magnet of the connector and permit the restoration of said connector to normal condition, said armature engaging the spring 303, which is connected by way of the local conductor 302, and the contacts 297, 298, of the selector, with battery 205, to provide a locking circuit for the relay 305 independent of the apparatus of the connector. The armature 440 is adapted when attracted to complete the continuity of the conductor 441 leading from line conductor 301 to a busy signal apparatus, armature 440 being connected with a vibrating arm adapted to intermittently engage a contact connected by conductor 442 to earth, and with a contact connected with a conductor 443 leading through a busy tone apparatus, to earth; so that the busy tone apparatus and ground conductor 442 are alternately applied to the line conductor 301 and so to the ring strand 9 of the connecting circuit, thereby applying a distinctive busy tone to the calling subscriber's telephone set and to the operator's telephone set when she listens in by means of her listening-key.

The intermittent ground applied to the line conductors 301 and 153 is arranged to cause a peculiar flashing of the supervisory signal representing the called line, and this result is accomplished in the following way: the resistance of the winding 416 of relay 417, which is included with the supervisory relay representing the called line in the metallic circuit with the battery 12 at the connecting circuit is too great to permit the energization of the said supervisory relay. Said relay 417 is provided with a low resistance winding 444, included in a shunt 445, about the high resistance winding 416 of said relay, said shunt being controlled by a relay 446 included in the trunk conductor 153 in the path of current from grounded battery 203; and when the ground is applied by the busy test apparatus to the conductors 301, 153, relay 446 is intermittently energized and makes and breaks the shunt 445, including the winding 444, whereupon the supervisory relay of the called line intermittently receives sufficient current to cause the same to vibrate its armature, and the supervisory lamp is caused to give a distinctive signal, indicating to the operator that the called line is busy.

The feature of testing the called line just described forms no part of the present invention, but is described and claimed in an application of James L. McQuarrie and Albert M. Bullard, Serial No. 336,401, filed September 27th, 1906.

*Signaling the called party.*—The line conductor 300 normally leads from the primary selector through normally separated contact spring 326 and armature 447 of relay 328, armature 448 and back contact of the ringing relay 449 to the line brush 450 upon the shaft of the connector; while the line conductor 301 leads through the normally separated front contact spring 320 and armature 451 of the connecting relay 323, through the armature 452 and back contact of the ringing relay 449 to the line brush 453. Assume that the line number 1132, with which the connector has united the trunk and the connecting circuits, is free, a circuit will be completed by the local connector contacts leading from the battery associated with the called line, through test conductor 433, connecting relay 323, polarized relay 391 to earth through the armature 432 and front contact of the relay 431, which relay is maintained energized after the relay 183 is excited, through whose normal contacts 181, 182 the initial current from battery 411 passed, by reason of the contact of armature 420 of relay 183 connected with battery 203 in the trunk circuit, with spring 182, thus substituting battery 203 to maintain an operative circuit for the relay 431. This current in the testing conductor from the battery of the idle called line is sufficient to energize said relay 323, which draws up its armatures 451, 455, and 456. The armature 451 separates springs 320, 321, engaging spring 320 to complete the continuity of line conductor 301, opening the circuits and disconnecting the local apparatus of the connector from the limb 301; the armature 455 is connected with a conductor 457, which leads through the winding of relay 458 to the test conductor 433 between the connecting relay 323 and relay 391; said armature 455 when attracted engages the member of springs 386 which is connected with the portion of conductor 387 leading to the conductor 324 and earth; so that the continuity of the test conductor is maintained independently of the armature 432 of relay 431, current flowing from the battery of the called party's line over the conductor 433 through relay 323, conductors 457, 387 and 324, to earth, maintaining the connecting relay 323 energized. This current also operates relay 458 which is concerned with the selective ringing to be described hereinafter.

The remaining armature 456 of the connecting relay forms the terminal of a conductor 459 leading through contacts 460 of the ringing relay 449, winding of said relay, contacts 461 of relay 328, armature 432 and back contact of relay 431, which is now deenergized, to conductors 430, 329 and 324 and earth. Said armature 456 in its attracted movement separates springs 438, preventing the operation of the busy test apparatus and engaging the member of said springs which leads to the pulsator 436, so that an impulse of current passes from said pulsator over conductors 437, 459, 430, 329, 324 to earth, operating relay 449. Relay 449, in attracting its armature 462, which is connected with battery 463, completes a locking circuit 459, 430, 329, 824, for said relay 449, under the control of springs 461 of relay 328. The armatures 448, 452, with their back contacts are normally included in the line conductors 300, 301, the armatures being connected with the portions of said conductors leading directly to the brushes 450, 453, respectively.

The armature 448 of relay 449, when attracted engages a front contact connected with a conductor 464, leading through a winding of a relay 465 to the armature of relay 458, which is now energized, said armature engaging a front contact connected with generator 466 of positive current. The armature 452 of the relay 449 when attracted engages its front contact which is connected with the conductor 467 leading through a winding of the relay 465, conductors 329, 324 to earth. Therefore, when the relay 328 operates, it completes a locking circuit for relay 449 and ringing current is applied to the line from the free pole of generator 466, conductor 464, winding of relay 465, to the armature 448 and front contact of relay 449, line conductor 300, line brush 450 of the connector, out over a limb of line 1132 and through the bell at the substation, said current returning over the other limb of the line 1132 through brush 453 of the connector, and thence over line conductor 301, armature 452 and front contact of relay 449, conductor 467, winding of relay 465 to conductors 329, 324 and earth.

The relay 465 included in the said ringing circuit is not responsive to the current flowing in the circuit above traced, owing to the high resistance of the bell at the substation, but when the called subscriber responds by removing his telephone from its hook, a path of low resistance is established at the substation around the bell, and sufficient current flows in the circuit traced to operate said relay 465. Said relay 465 thereupon attracts its armature 408, which is adapted to complete a circuit leading from the free pole of battery 470 over conductor 469, through the winding of relay 328, conductors 469, 329 and 324 to ground, thereby effecting the operation of relay 328. The armature 471 of relay 328 is connected with said conductor 469 between the relay 328 and armature 468 of relay 465, and when attracted separates springs 461, thereby opening the circuit of the ringing relay 449, which releases its armatures, the armatures 448, and 452 opening the ringing circuit before traced and reestablishing at their back contacts the continuity of the line conductors 300, 301, the armature 462 of the ringing relay in its retractive movement removing the battery 463 from connection with said relay.

The armature 471 of the relay 328 engages the member of springs 461 which is connected through the armature 432 of relay 431 and conductors 329, 324 to earth, thereby completing a locking circuit for the relay 328 from battery 470, conductor 469, armature 471 and one of said contacts 461, conductors 430, 329, 324 to earth. The armature 447 of relay 328 in its attractive movement separates contact springs 326, 327, engaging the spring 326 to complete the continuity of line conductor 300.

The called subscriber is now supplied with current for transmission purposes from the battery 203 in the metallic circuit over the trunk and line conductors. Current in this circuit operates relay 446 which establishes the shunt 445 about the high resistance winding of relay 417, said shunt including the low resistance winding 444 of said relay, whereupon the supervisory relay of the called line associated with the connecting circuit receives sufficient current for its operation, opening the circuit of the supervisory lamp of the called party to extinguish the same. The extinguishment of said lamp informs the operator that the called party has answered. It should be noted at this point that for the automatic signaling of single party lines, relay 458 and its contacts are not needed since conductor 464 may be connected directly with a generator of ringing current.

*Restoration of the switching mechanism.—* When the conversation is concluded and the subscribers hang up their telephones, the supervisory signals before the operator are displayed, the supervisory relay of the called line being deprived of current by reason of the opening of the shunt 445 about the high resistance winding of the relay 417 controlled by relay 446, which in turn responds to the called subscriber's telephone switch. The operator now removes plug 7 from the answering jack 3 of the calling line, thereby opening the circuit of relay 16, which breaks the circuit of the supervisory lamps, relay 30, and the relay 61 of the office selector, Fig. 2. The relay 61 of the office selector in releasing its armature 63 opens at another point its circuit, and armature 64, in retracting, disconnects battery 67 from wire 69.

The armature 65 of said relay 61 in retracting, opens the circuit of the retaining magnet 66, which permits the return movement of the office selector under the control of a suitable spring. Said armature 65 when resting against its back contact connects battery 67 with a conductor 472 which leads through springs 473 closed while the office selector is away from normal position, to the conductor 69, current from battery 67 thereby flowing through the contacts 70, 71 of relay 72, through relay 73 to earth, which thereupon attracts its armatures, opening the link conductors 8, 9, to maintain the brushes 51, 52 dead during the return movement of the office selector, contact springs 473 being opened when the selector reaches normal position to break the circuit above traced for relay 73 and restore the continuity of the link conductors. It should be noted at this point that during the return movement of the selector, the relay 61, which controls the placing of the same in condition for operation, is in a circuit open at contacts 62 separated while the selector is away from normal position, and at its armature 63 and front contact, so that the selector cannot be taken for use by the connecting circuit until it has returned to normal position, thus preventing the possibility of an error in setting up a connection.

The attraction of armature 117 of relay 73 of the selector, removes current of the battery 67 from the local brush 53 and local trunk conductor 137 leading to the trunk selector, whereupon the retaining magnet 138 is deprived of current and the trunk selector thereupon restored to normal condition.

It will be noted that during the return movement of the trunk selector the circuit of its retaining magnet 138 is open at two points, namely, the contacts 139 which are open while the selector is away from normal position, and at the armature and front contact of the retaining magnet, so that the trunk selector may not be taken for operation until it has reached normal position.

Turning now to the distant office, the high resistance winding 416 of relay 417 was deprived of current the instant the office selector commenced its return to normal condition. Said relay thereupon retracted its armature and opened the local circuit of relay 183, which restored the normal circuit conditions of the apparatus of the trunk lines and removed current from the retaining magnet 194 of the primary selector, which thereupon released the shaft 195 of the stepper, and removed current from the relay 209, permitting it to restore the apparatus of the selector to normal condition and remove current of battery 205 from local brush 297 and local conductor 302 leading to the connector and retaining magnet of said connector. Said retaining magnet of the connector thereupon releases its armatures, permitting the restoration of the connector to normal condition.

The armature 308 of the retaining magnet of the connector in retracting opens the locking circuit of relay 328, which thereupon releases its armatures, armature 447 opening the line conductor 300 to maintain brush 450 dead during the return of the connector. In like manner, the brush 453 of connector is dead during its return movement, since relay 323 is deprived of current the instant the return movement starts, and the armature 451 of said relay 323 in retracting, breaks the continuity of the line conductor 301.

In case the operator desires to take down the connection without removing her answering plug, as where she has commenced to set up a wrong connection and before the relay 183 at the distant office associated with the primary selector has been operated by relay 417, she may operate the key 36, Fig. 1, which breaks the circuit of relays 30, 31 and 61. Relay 31 retracts its armature before relay 61, which is sluggish in recovering, retracts its armatures, so that an impulse of negative current from battery 12 is allowed to flow out through ring strand 9, trunk conductors 132, 153, conductor 284, to earth through the polarized relay 178, which tilts its armature in a clockwise direction, applying a momentary impulse of current from battery 411 through the high resistance winding 416 of relay 417, conductors 174, 152, 131, tip strand 8 to the grounded pole of battery 12. Said relay 417 responds to this momentary impulse and completes a momentary circuit for relay 183, by way of conductors 188, 419, and battery 196, said relay 183, in operating, attracting its armatures to open the locking circuit previously established from battery 196 through relay 193 and the retaining magnet 194 of the primary selector, permitting the restoration of apparatus controlled by relay 193 and the retaining magnet 194 to normal condition, relay 183 thereupon becoming deënergized. The apparatus of the office selector and trunk selector are now restored to normal condition as previously described, and the operator may proceed to set up a new connection.

The feature of automatic restoration of the switching mechanism just described forms no part of the present invention, but is described and claimed in an application of James L. McQuarrie and Albert M. Bullard, Serial No. 336,401 filed September 27th, 1906.

*Selective signaling or multi-station lines.*—Let us now assume that the subscriber with whom conversation is desired is one of a number of parties on the same line, for example, subscriber No. IV on the party line shown in Fig. 9. In said figure are shown the connector terminals of the stations of the party line, it being understood that the brushes carried by the connector shaft before referred to would sweep over said terminals. The operation of selecting proceeds as before described, up to the moment when the connector brushes stop at the terminals representing station No. IV.

The terminal 473 representing station No. I of the party line (which is connected by conductor 474 with the limb 475 of the party line) is connected with a conductor 480, which leads to the terminal 477 of station No. II, terminal 473 of station No. III, to terminal No. 477 of station No. IV. In like manner, the terminal 477 of station No. I (which is connected by a conductor 478 with the limb 479 of the party-line) is connected with a conductor 476 leading through the terminal 473 of station No. II, terminal 477 of station No. III, to terminal 473 of station No. IV. With this arrangement, it will be seen that opposite terminals of the stations of the party line are connected together. The four local terminals 481 of the stations of the party-line are connected by conductor 482, a resistance 483 being included in said conductor between the terminals 481 of the second and third stations. The conductor 482 is connected with the thimble of the answering jack of the party line and with the free pole of the battery associated with said line, and the resistance 483 is adapted when placed in series with the testing conductor 433 of a connector to prevent the operation of the relay 458, whose armature normally rests against a contact connected with a negative source of ringing current 484.

When the connector reaches the terminals 477, 473, 481 of station No. IV, contact brush 450 of the connector will rest upon terminal 477, which is connected by conductors 480, 474 with limb 475 of the line, and contact brush 453 of the connector will rest upon terminal 473 which is connected by conductors 476, 478 with limb 479 of the line, and contact brush 434 of the connector will rest upon terminal 481 which leads through the resistance 483 and conductor 482 to the free pole of battery associated with the called line. Thus when connection is made with terminals of station No. IV of the party line, a circuit will be completed from the free pole of said battery through wire 482, resistance 483, contacts 481, 434, conductor 433, thence through the connecting relay to earth, and upon the operation of the connecting relay through conductor 457 including the marginal relay 458 to earth. The resistance 483 in this circuit will prevent the operation of the marginal relay 458 and, since the connecting relay 323 has operated ringing relay 449, as previously described, ringing current will flow from the free pole of the negative generator 484 through the back contact and armature of relay 458, conductor 464, winding of relay 465, armature 448, and front contact of ringing relay 449, brush 450 of the connector, thence to the terminal 477 of station No. IV, conductors 480, 474, to limb 475 of the line, and thence to earth through the bell at station No. IV. Relay 465 will respond when the called subscriber answers to cut off ringing current as previously described.

If station No. III of the party line were desired, negative ringing current would be applied to limb 479 of the line to operate the bell in said station. If station No. II were desired, the test brush resting upon the test terminal of said station would exclude resistance 483 from the circuit of relay 458, said relay thereupon attracting its armature and applying positive current to the limb 475 of the line, to operate the bell at station No. II. In like manner, if station No. I were desired, positive ringing current would be applied to limb 479 of the party line to operate the bell at said station. If the party line were busy the relay 323 would fail to operate and would thereby prevent the application of ringing current to the line and bring about the operation of the lockout and test relay 305 to inform the operator of the busy condition of the line.

It will be apparent that any selective or code system of ringing or signaling may be embodied in the present system, wherein the test wire is made to do manifold duty in discriminating and in choosing the proper kind of current for selective ringing.

*Calling a private branch exchange.*—Private branch exchanges are in practice usually assigned but one telephone number in a directory. That number is always the one ordered by the subscriber. Naturally it is the lowest number of all the lines leading to the private branch exchange. In the present system, advantage has been taken of this fact for convenience in testing such lines. When the connector has advanced its brushes to the first line and after testing the same finds that it is busy, the brushes are automatically stepped ahead to test the next line, and so on until an idle line is reached. Thus there are two functions to be performed by the selecting mechanism, in addition to those described in connection with the single and multi-station lines. These are, first, when the connector reaches the first private branch exchange line, and finds the same busy, it must step automatically ahead to test the next line leading to that private branch exchange, and must continue testing the lines until a free line is found, when it must connect therewith. Second, when calling a private branch exchange, all of whose lines are busy, the connector must progress its test brush over contacts of all the lines until it reaches the terminals of the last line, which must cause it to give the busy signal to the operator, as in the case of calling a busy direct line.

The test brush of the connector is advanced to the test terminal of the first trunk line, and finds current of a given polarity which, if such line is busy, operates mechanism to advance the brush to the next trunk line terminal and from terminal to terminal until an idle trunk line is reached. When the test brush reaches the last trunk terminal after testing the other trunk lines, it will find current of opposite polarity thereat, which if such last line is busy, will operate mechanism to apply a busy signal to the operator's connecting circuit and effect the automatic restoration of the connector to normal condition.

Let us make connection with a private branch line shown in Fig. 10, which may be the third of a number of trunk lines leading to a private branch exchange No. 1240. The trunk line shown comprises conductors 485, 486, leading from the branch exchange to terminals upon the connector, a local conductor 487 being provided for the trunk line shown, said local conductor leading from the free pole of a positive grounded battery 488 through the usual cut-off relay and answering jack of the trunk line to the local terminal of said trunk line upon the connector. Up to the moment of test, there is no departure from the previous description of the method of operation, but when the test brush 434 reaches the local terminal of the first trunk line it finds instead of negative current, current from a positive battery 488 thereat, which current flows over the test conductor 433 through the relays 323, 391, to earth through the armature 432 of the relay 431. Relay 391 is polarized and responds only to the positive current. If such first private branch exchange line is already in use, insufficient current will flow through relay 323 to operate the same, for, as already explained, a line is made busy by a shunt to ground from this test terminal formed either by an answering cord or by the grounded test conductor, which a connector places thereat. But there will be sufficient current to actuate the polarized relay 391. The armature 489 of the polarized relay 391 is connected with the pulsator 436, and the front contact of said armature 489 is connected with conductor 490, which leads to conductor 390 through the lifting magnet 388 of the connector, conductors 387, 324, to earth through the armature 308 and front contact of the retaining magnet. The armature 400ª of said relay 391, in its attractive movement, opens the circuit of the stepping magnet 388 leading to the line conductor 300 and to the selector. Under these conditions, the pulsator 436 applies an impulse to the stepping magnet 388, which lifts the shaft to bring its brushes into engagement with the terminals connected with the second trunk line leading to the private branch exchange. If this line is busy, positive current from the battery 488 of the second trunk line will continue to energize relay 391, which will cause the pulsator 436 to operate the stepping magnet 388 and lift the shaft another step to the terminals of the third trunk line, which we will assume to be free, whereupon relay 323 will operate because of the increased flow of current from battery 488, since the trunk line is free, and said relay 323 will open the circuit of the pulsator 436 and cause ringing current to be applied as before described.

During the time of the testing expedition of the connector, the sending apparatus is not in circuit. It is automatically disconnected as soon as the brushes carried by the connector shaft reach the terminals of the first private branch exchange line, as in the case of selecting a single station line heretofore described.

If all the lines leading to the private branch exchange, No. 1240, had been busy, the connector would have stepped to the terminals of the last trunk line, and would then return to zero and give the busy signal since the last private branch exchange is connected in the same manner as a subscriber's line, that is, its test terminal is connected with the free pole of a negative grounded battery, which would therefore cause relay 391 to retract its armatures, while relay 323 would remain in an inoperative position, such combination of relays effecting the operation of the test and lockout relay 305.

The private branch exchange feature above described forms no part of the present invention, but constitutes the subject matter of an application of James L. McQuarrie and Albert M. Bullard, Serial No. 350,348, filed January 2nd, 1907.

*Reverting calls.*—When the subscriber of a party line wishes to converse with another subscriber on the same line, he orders the line and station number as though it were another line than his own. Subscribers seldom grasp the significance of the multi-station line, and usually order the desired number without giving the matter any thought The operator's efficiency would be materially reduced if she were called upon to analyze every call by reading the numbers of the answering jacks and comparing them with the number ordered. So we have provided means for automatically drawing her notice to the fact that a call is being made for a subscriber on the same line whereon is located the calling subscriber, that is, a reverting call. This is accomplished by a peculiar flashing of the supervisory lamp representing the called party, brought about when the connector unites with the calling line terminals.

Turning now to the sending apparatus, it will be remembered that the relay 33, Fig. 5, was operated after the units key of the tens and units controller had operated to advance the brushes of the connector to the terminals of the desired line. This relay in attracting its armature 32, opened the circuit of relay 26 and relay 31, already described, and completed a momentary circuit for a revertive call relay 491, Fig. 1, said circuit extending from the free pole of battery 17, through the armature and front contact of relay 16, conductors 18, 35, through the armature 492, and front contact of relay 31 (before the relay 31 has retracted its armatures) to conductor 493, thence through the winding of the relay 491, armature 32 and front contact of relay 33, to earth. Relay 491 is thus momentarily operated each time the connector reaches the terminals of a desired line. Relay 491 is provided with an armature 494 adapted when attracted to open a short circuit 495 about a resistance 496 included in the conductor 15 leading from the sleeve of the answering plug to earth through the relay 16. The local conductor 15, in case the connector makes connection with the terminals of the calling line, as in the case of a revertive call, would extend in shunt of the testing conductor 433 of the connector, and since the relay 491 has opened the short circuit 495 to include the resistance 496 in conductor 15, the shunt about the test conductor 433 will not be of sufficiently low resistance to prevent the operation of the connecting relay 323, which will operate to complete the continuity of the line conductors 300, 301, leading to the line brushes of the connector. The ringing relay 449 of the connector will operate, but will be immediately cut out of circuit by the relay 465, which will respond to the low resistance path at the calling station where the telephone is removed from the hook. The connector will therefore stop upon the terminals of the calling line.

The armature 497 of the relay 491 with its back contact normally completes a short circuit 498 about a high resistance 499 included in the ring strand of the connecting circuit between the repeating coil and the answering plug; the armature 497 being connected directly with the ring 11 of the answering plug, and said armature when attracted engages a front contact connected with a conductor 501 leading to earth through a winding 502 of the relay 60. It will be seen that the relay 60 is momentarily legged off from the point 500 each time a call is made, but said relay will not respond to current from battery 12, while the high resistance 499 is in its path, but when the connector makes connection with the calling line, the potential at point 500 is raised, since current from the free pole of battery 12 may flow out over the ring strand, through the connector to the terminal of the connector connected with the limb 2 of the calling line, through contacts of the jack and plug to the point 500, which increase in potential will allow sufficient current to flow through the winding 502 to operate relay 60. It should be stated at this point that when a revertive call is made, no inter-office trunk would be needed, since the line called (which is the calling line) terminates in the office where the call originates, but instead the three wire trunk leading from the trunk selector to a primary selector would be employed, so that a direct path for current from battery 12 would be provided through the link conductor 9 and trunk conductors 132, 515, 301 to the long spring of the answering jack 3 of the calling line, ring 11 of the answering plug 7 to point 500. Relay 60 now operates and attracts its armatures 504, 505; the armature 505 in its attractive movement completes a locking circuit for the relay 60, independent of the revertive call relay 491, said armature 505 being connected with a conductor 506 leading through a winding 507 of said relay to conductor 57, which extends through the springs 58, 59 associated with said relay; said armature when attracted separates the springs 58, 59, engaging the spring 59, to include the winding 507 of relay 60, in the circuit of battery 17 including the relay 61 of the selector; said circuit extending from the free pole of battery 17 through the armature and front contact of relay 16, conductors 18, 35, through the winding of relay 30, armature 56 and front contact of said relay, conductors 57, 506, winding 507 of relay 60, armature 505 and contact 59 of said relay, to conductor 57, thence through the relay 61 of the selector to earth through the armature 63 and front contact.

The armature 504 of the relay 60 is included in the portion of the ring strand 9 of the connecting circuit leading directly through the supervisory relay representing the called line to the free pole of battery 12, and the front contact of said armature is connected with conductor 508 which leads to the contact of a vibrator 509, said vibrator comprising a vibrating spring connected to earth and adapted to intermittently engage said contact. With this arrangement, when armature 504 is attracted, the vibrator 509 will intermittently make and break a circuit through the said supervisory relay, and cause a peculiar flashing of the supervisory signal representing said called line, which would indicate to the operator that the party with whom connection is desired is a subscriber having a station upon the calling line. This special signal means to the operator a special procedure on her part for ringing the desired subscriber, since relay 465 of the connector opened the ringing circuit immediately upon the completion of the connection by the connector with the calling line.

The connector and switching mechanism obviously are not needed for transmission when two subscribers are talking on a single line. All that is essential is that a plug be inserted in the answering jack having a cord secured thereto equipped with a supervisory lamp and a key for manual ringing. The operator may therefore operate her key 36 to restore the switching mechanism to normal condition and apply ringing current to the calling line by means of a suitable ringing key, or she may withdraw her answering plug, thereby restoring the switching mechanism, and substitute a special single cord having a supervisory signal and ringing key.

There is shown in Fig. 11 a much simplified arrangement of apparatus for controlling the primary selector, through which local calls, that is calls originating and terminating in lines extending from the same exchange, may pass. This simplification of apparatus is rendered possible by the provision of the three-wire trunk circuit between the office selector apparatus and the primary selector, notably trunk circuit 514, 515, 516, when both the office selector and primary selector are located in the same exchange. The operation of this selector shown in Fig. 11 is entirely analogous to the operation of the selector 50 shown in Fig. 2. The relays 523 and 524, respectively, performing the same function as the relays 72 and 73, respectively, the retaining magnet 518 the same function as the retaining magnet 66 and the stepping magnets 538 and 530, respectively, the same functions as the stepping magnets 55 and 54, respectively. It is thought, therefore, no detailed description of the operation of this selector is necessary. The conductors 300, 301, 302, from the primary selector shown in Fig. 11 lead, as do the similarly numbered conductors from the primary selector shown in Fig. 3, to a final connector, as shown in Fig. 4.

It will be understood that while a number of batteries are shown throughout the drawings, batteries of the same polarity may be, and usually are, in practice one and the same. In like manner, while a number of pulsators are shown, in practice, pulsators having the same speed and voltage may be one and the same.

While I have illustrated and described in detail a system embodying my invention, I do not desire to limit myself in any way to the precise circuits and apparatus shown and described, since numerous modifications, alterations and additions may be made in the circuits shown, without departing from my invention.

I claim:

1. In a telephone exchange system, the combination with a telephone line extending from a substation to a central office, of a connecting circuit at the central office, an operator's connection switch for uniting said connecting circuit with said telephone line, line switching mechanism at the central office, sending apparatus adapted to be set by the operator to actuate said switching mechanism and unite the connecting circuit with a desired line, a relay 449 associated with said line switching mechanism and adapted to apply ringing current to a line with which said mechanism makes connection, a relay 323 in a circuit completed when said switching mechanism unites with a desired line, a shunt about said relay 323 adapted to prevent its operation, said shunt being closed in case the line with which said switching mechanism unites is busy, said relay 323 responding in case the line is free, and a circuit for relay 449 closed by relay 323 when operated.

2. In a telephone system, the combination with a telephone line having a plurality of stations thereon, of a connector switch having a plurality of stationary contacts therein, one for each station on said line, a test brush for engagement with said contacts, a source of selective ringing current and means dependent upon the terminal with which said brush makes connection for differently associating said source with said line to signal a particular station on said line.

3. In a telephone system, a plurality of stations on a single line, a corresponding plurality of multiply connected sets of contacts for said line, an automatic switch having brushes for connecting with a particular set of terminals for said line and means automatically actuated upon said brushes being positioned on one of said sets for selectively signaling the corresponding station on said line.

4. In a telephone exchange system, the combination with a connector adapted to unite with a telephone line in an exchange, of a relay 449 adapted to apply ringing current to a line with which the connector unites, a relay 323 and a circuit therefor completed when the connector unites with the telephone line, a shunt established about said relay 323 in case the line is busy to prevent the operation of said relay, said relay 323 responding in case the line is free, a circuit for said relay 449 completed by relay 323 when operated, a relay 465 in the ringing circuit unresponsive to said ringing current while the normal high resistance of the line is included in the circuit, said relay responding when the resistance of the line is decreased by the removal of the telephone at the substation, and means controlled by relay 465 for opening the circuit of relay 449 to remove ringing current from the line.

5. In a telephone exchange, the combination with a line switching device adapted to connect with the telephone lines of the exchange, of a relay 449 adapted to apply ringing current to a line with which the switching device has made connection, a relay 323, an operating circuit for said relay completed when connection is made by the switching device with an idle called line, a circuit for relay 449 controlled by relay 323, and a relay 465 in the ringing circuit energized upon response of the called subscriber, said relay when energized being adapted to open the circuit of said relay 449.

6. In a telephone system, a line extending from a number of sub-stations to an exchange, a source of ringing current, a switch having a plurality of stationary terminals connected with said line, a brush for said switch movable into connection with any of said terminals, a resistance interposed between certain terminals and automatically operated means depending for its operation on the inclusion or exclusion of said resistance in said circuit for differently associating said source with said line.

7. In a telephone exchange system, the combination with a telephone line extending from a substation to a central office, of a connecting circuit at the central office, a manually operated connection switch for uniting said connecting circuit with the line, a party telephone line extending from substations to a central office, mechanical line switching mechanism, sending apparatus adapted to be set by the operator to actuate said mechanical switching mechanism and unite said connecting circuit with the party line, and means automatically operated when said switching mechanism unites with the party line for selectively signaling the desired station of said line.

8. The combination with a multistation telephone line, of a circuit, an automatic connection switch for uniting said circuit with said line, and means automatically operated upon the closure of said connecting switch and under the control thereof for selectively signaling the desired station of said line.

9. In a telephone exchange, the combination with a telephone line extending from a number of substations to a central office, of an automatic connection switch for making connection with such line at the central office, mechanism actuated upon the closure of said connection switch and under the control thereof for automatically applying proper current to said line to selectively signal the desired station thereon.

10. In a telephone exchange, the combination with a multistation telephone line extending from substations to a central office, of a connector at the central office having terminals representing stations on said line, automatically operated mechanism for actuating said connector to unite with the terminals representing the desired station on such line, and mechanism adapted to automatically apply ringing current of proper character to said terminals to selectively signal the desired station.

11. The combination with a metallic circuit two party telephone line, the stations of said line having bells of opposite sign connected between a limb of said line and a return conductor, an automatic connection switch for making connection with said line, sources of positive and negative ringing current connected to said return conductor, and means automatically operated upon the closure of said connection switch for applying current from the proper source to said limb to selectively signal the desired station.

12. The combination with a metallic circuit four party telephone line, the bells of said stations being included in ground branches from the limbs of said line, the bells in the two branches from each limb being of opposite polarity, an automatic connector carrying terminals for each station united with said line, sources of grounded positive and negative ringing current, and means automatically operated when said connector unites with the terminals of the desired station on said line for applying current of proper polarity to the proper limb of said line to signal the desired station.

13. The combination with a metallic circuit multistation telephone line, of stations having positive and negative bells connected from both limbs of the line to ground, of an automatic connection switch adapted to unite with said line, sources of grounded positive and negative current, means automatically operated upon the closure of said connection switch for applying current of proper character to the proper limb of said line to signal the desired station, and means automatically operated when the called subscriber responds for cutting off said ringing current from the line.

14. In a telephone system, the combination with a party line, a connector switch having a plurality of sets of contacts connected with the limbs of said party line, transposed connections extending between corresponding line contacts of two of said sets, a resistance between certain test contacts and automatic means depending upon said transposition and upon the inclusion or exclusion of said resistance in the test circuit for selectively signaling a particular party on said line.

15. In a telephone exchange system, the combination with a telephone line extending from a number of substations to a central office, of a connector at the central office having terminals representing stations on said line, a contact arm adapted to sweep over said terminals, the local terminals of said stations being connected together, a resistance included in the circuit between predetermined local terminals, sources of ringing current of different character, a relay controlling the character of current to be applied to said line, and a circuit for said relay completed when the contact arm engages the terminals of the desired station on said line, said circuit including all or a portion of said local terminals, dependent upon the station called, said relay remaining inert when said resistance is included in its circuit but responding when said resistance is excluded from the circuit.

16. In a telephone exchange system, the combination with a telephone line extending from a number of substations to a central office, of a connector having terminals representing the stations on said line, a contact arm adapted to sweep over said terminals, the local terminals of said stations being connected together, a resistance included in the circuit between predetermined local terminals, a relay 323 having an operative circuit completed when the contact arm connects with the terminals of an idle line, means controlled by said relay when energized for connecting a ringing circuit with said line, a relay controlling the character of ringing current to be associated with said ringing circuit, and a circuit for said relay completed when the contact arm unites with the terminals of the desired station on the party line, said circuit including all or a portion of said local terminals dependent upon the station desired, said relay remaining inert when said resistance is included in the circuit to apply ringing current of one character to said ringing circuit, but being responsive when said resistance is excluded from the circuit to apply ringing current of different character to said ringing circuit.

17. The combination with a multistation telephone line extending in two limbs from substations to a central office, of a connector having a pair of line terminals for each station on said line, conductors connecting the line terminals of one station with opposite line terminals of the next station and with the limbs of said line, a contact arm carrying brushes adapted to sweep over said terminals, a source of ringing current, and means automatically operated upon connection of said brushes with the terminals of the desired station of said line for connecting ringing current from said source with one of said brushes, said brush when resting upon one terminal applying said current to one limb of the line to signal one station thereon, and when resting upon the corresponding terminal of the next station applying said current to the opposite limb of the line to signal another station thereon.

18. The combination with a multistation telephone line extending in two limbs from a substation to a central office, of a connector at the central office having a pair of line terminals and a local terminal for each station on said line, conductors connecting the line terminals of one station with the opposite line terminals of the next station, and with the limbs of the line, the local terminals of said stations being connected in series, a resistance included in the circuit between predetermined local terminals, sources of positive and negative pulsating current, a relay controlling the character of ringing current applied to the line, a circuit for said relay completed upon the engagement of the contact arm with the local terminal of the desired line and including all or a portion of said local terminals dependent upon the station desired, said relay operating in case said resistance is excluded to bring a source of current of one character into condition to be applied to the line, but remaining inert when said resistance is included in the circuit to bring into operative condition a source of ringing current of different character, and electromagnetic mechanism operated upon the connection of the contact arm with the terminals of a desired station for applying current of the character determined by said relay to one of the contact brushes of the contact arm, said brush in engaging the terminal of one station applying such current to one limb of the line and in engaging the corresponding terminal of the next station applying said current to the other limb of the line.

19. In a telephone exchange system, the combination with a party line extending from substations to a central office, of a connector at the central office, a pair of line terminals and a local terminal for each station of said line upon said connector, such local terminals being connected in series to the pole of a battery, a resistance included in the circuit between the second and third local terminals, conductors connecting opposite line terminals of the stations in series and with the limbs of the line, an arm carrying brushes adapted to sweep over the terminals upon the connector, a conductor adapted to be connected from the local brush of said arm to the opposite pole of said battery, sources of positive and negative ringing current, a relay 458 in said conductor adapted to have a circuit therefor completed at the local terminal of the desired station, said relay being unresponsive when said resistance is included in its circuit but operating when said resistance is excluded from its circuit, a relay 323 in a circuit completed at the local terminal of the desired station, said relay 323 controlling the application to one of the brushes of the arm of the ringing current determined by relay 458, said relay 458 when energized bringing one source of current under the control of relay 323 and when unresponsive bringing the other source of current under such control, said contact brush when resting upon the terminal of one station applying said current to one limb of the party line, and when resting upon a corresponding terminal of the next station applying said current to the opposite limb of the line.

20. In a telephone system, the combination with a party line extending from a number of substations to a central office, a connector switch having a plurality of sets of stationary terminals connected with said line, a contact carrying arm for said connector switch movable into connection with any one of said sets of terminals, transposed connections extending between the line contacts of said sets of terminals, a resistance interposed between other contacts of said sets and automatically operated mechanism depending for its operation upon the inclusion or exclusion of said resistance in its circuit for selectively signaling a particular station on said telephone line.

21. In a telephone system, the combination with a telephone line, four polarized bells connected with said line, two connected between one limb of said line and earth and two connected between the other limb of said line and earth, an automatic switch at the central office, four sets of contacts in said switch connected with the limbs of said telephone line, transposed line connections extending between corresponding contacts of said sets, movable connecting brushes adapted to be directively moved into contact with any of the sets of terminals, a positive and a negative ringing current source, either of which may be connected with one of the brushes registering with the line terminals in said connector switch, and automatic means for connecting the positive current source with said brush when said brush is connected with either of two of said sets of line terminals and for connecting said negative source with said brush when said brush is connected with either of the other two sets of said line terminals whereby any one of the four polarized bells may be selectively operated.

22. In a telephone exchange system, the combination with a telephone line extending from a substation to a central office, of a connecting circuit at the central office, a manually operated connection switch for uniting said connecting circuit with said telephone line, mechanical line switching mechanism adapted to unite said connecting circuit with other lines in response to calls, a source of ringing current, a relay operated when said switching mechanism connects with an idle line to govern the application of said ringing current thereto, and a busy signal applied to the connecting circuit under the control of said relay when the switching mechanism unites with a busy line.

23. In a telephone exchange system, the combination with a telephone line extending from a substation to a central office, of a connecting circuit at the central office, a switch for uniting said connecting circuit with said line, mechanical switching mechanism adapted to unite said connecting circuit with other telephone lines, a relay 322, a circuit therefor closed when said switching mechanism unites with a wanted line, a shunt around said relay established when said switching mechanism unites with a busy line, whereby said relay responds when the called line is free and remains inert when said line is busy, a source of ringing current applied to such line under the control of said relay when the switching mechanism unites with an idle line, and a busy signal applied to the connecting circuit under the control of said relay when said switching mechanism unites with a busy line.

24. In a telephone system, the combination with an automatic connector switch, of an operator's controlling apparatus for controlling connections through said connector switch, selective signaling apparatus associated with the connector switch, a multiparty telephone line and a plurality of keys, one corresponding to each of the parties on said telephone line and under the control of the operator and each adapted by its depression to differently control said connector switch to selectively signal one of the stations upon said party line.

25. In a telephone exchange system, the combination with telephone lines, of spring-jacks for such lines at the central office, mechanical line switching mechanisms at the central office, a connecting circuit at the central office, a plug for engaging the jack to unite said connecting circuit with the line thereof, one of said switching mechanisms being adapted to unite said connecting circuit with the called line, a relay in a circuit completed when said switching mechanism unites with the line, a shunt about said relay established at a switching mechanism or plug and jack already connected with such line to prevent the operation of said relay, a busy signal applied to the connecting circuit by said relay when the switching mechanism unites with a busy line, and a source of ringing current applied to said called line by said relay in response to the idle condition thereof.

26. In a telephone system, the combination with a plurality of multi-party lines, of a connector switch to connect therewith, operators' keys which, when depressed in a definite combination control the movement of said connector switch to connect with a certain line and means solely under the control of said switch automatically actuated upon making said connection to selectively signal a certain station on said line.

27. The combination with a line switching device, a contact carrying arm therefor, a stepping magnet for said arm, a controller, a pulsator, a circuit for said stepping magnet including said pulsator, a relay adapted when operated to complete said circuit, a circuit for said relay completed by the controller when set and by the pulsator when in one position, said pulsator when in the opposite position applying current to said stepping magnet circuit, and means actuated by said controller when the contact arm advances a predetermined distance to break the connection of said pulsator with the stepping magnet circuit.

28. The combination with a line switching device, of a contact carrying arm therefor, a stepping magnet for said arm, a controller, a pulsator having a grounded spring and a spring connected with the free pole of a grounded battery, a relay 94 adapted when energized to complete a circuit leading from the battery contact of said pulsator through the stepping magnet to earth, a circuit for said relay completed by the ground spring of the pulsator in engaging its contact, a locking circuit for said relay completed by said relay when energized, the battery spring of the pulsator in intermittently engaging its contact applying pulsating current to the circuit of the stepping magnet to operate the same, and means actuated by the controller when the contact carrying arm of the line switching device advances a predetermined distance for opening the circuit of said stepping magnet.

29. The combination with a line switching device, of a contact carrying arm therefor, a stepping magnet for said arm, a controller adapted to be set to determine the advance of said arm, a pulsator, a relay, a circuit for said stepping magnet including said pulsator controlled by said relay, a circuit for said relay, the pulsator when in one position coöperating with the controller after the same is set to complete said circuit, a locking circuit for said relay completed by itself when energized, said pulsator when in the opposite position applying current to the stepping magnet circuit, a relay, a circuit therefor completed by the controller when the contact carrying arm of the switching device travels a predetermined distance, said relay being adapted when energized to open the stepping magnet circuit.

30. The combination with a line switching device, of a contact carrying arm therefor, a stepping magnet for said arm, a controller comprising terminals corresponding to the terminals of said line switching device over which said contact carrying arm advances, a contact arm for the controller adapted to sweep over the controller terminals, a source of current having one pole connected with said arm, a key for connecting one of said controller terminals corresponding to the desired terminal of the line switching device with the other pole of said source, a stepping magnet for said controller arm, a relay, a pulsator, a circuit including the stepping magnets of said controller and line switching device, and said pulsator, adapted to be completed by said relay, a circuit for said relay completed under the joint control of the said key and pulsator when in one position, a locking circuit for said relay completed by itself when energized, said pulsator when in the other position applying current to the circuit of the stepping magnets, a relay connected in the circuit of said controller arm and energized when such arm reaches said predetermined terminal and the arm of the switching device is properly advanced, adapted to open the circuit of the stepping magnets.

31. The combination with a line switching device, of a contact carrying arm therefor, a stepping magnet for said arm, a controller comprising terminals corresponding to the terminals of said line switching device over which said arm advances, a contact arm for the controller adapted to sweep over the controller terminals, a source of current having one pole connected with said arm, a key for connecting one of said controller terminals corresponding to the desired terminal of the line switching device with the other pole of said source, a stepping magnet for said controller and a circuit therefor, a pulsator, a circuit including said pulsator and the stepping magnet of the line switching device, a relay adapted to complete said circuit, a circuit for said relay completed under the joint control of said key and the pulsator when in one position, said pulsator when in the other position applying current to the stepping magnet circuit, a relay in said circuit responsive to current waves adapted to make and break the circuit of the controller stepping magnet, whereby the stepping magnets operate one after the other, and a relay in the circuit of said controller arm energized when such controller arm reaches the predetermined terminal and the arm of the line switching device is properly advanced, adapted to open the circuits of the stepping magnets.

32. In a telephone system, a line switching device, a stepping magnet therefor, a stepping circuit for said magnet, a relay for completing said circuit, a circuit for said relay, an interrupter, said interrupter operating when in one position to complete said stepping circuit, and in another position to complete said relay circuit, whereby a full first impulse is transmitted to said stepping magnet.

33. A telephone system including a selector switch, an electromagnet for operating said switch, an impulse transmitting device adapted for transmitting impulses to operate said electromagnet, a primary or control relay having normally open contacts included in said impulse circuit, means for closing an energizing circuit for said primary relay, and means to prevent closure of said energizing circuit except between impulse periods of said device.

34. A telephone system including a selective switch, a magnet controlling travel thereof, a circuit therefor, a relay controlling a contact of said circuit, and interrupter means adapted to transmit energizing current to said relay to cause it to close said contact, said means also comprising time correlated mechanism to thereafter actuate said magnet.

35. A telephone system including a selective switch, a relay for said switch, a switch actuating magnet controllable by said relay, a contact in circuit with said magnet, a contact in circuit with said relay, and means continuously changing the connection of said contacts in alternation.

36. A telephone system including telephone lines, a line selector to select said lines, a magnet for said selector to adjust the same, a controlling relay for said magnet, a common interrupter for transmitting impulses to said magnet, and means controlled by said interrupter for energizing said relay and producing a time interval between said energization and the beginning of the first impulse transmitted to said magnet.

37. A telephone system including a selector switch, an electromagnet for operating said switch, an impulse transmitting device adapted for transmitting impulses to operate said electromagnet, means for connecting said impulse device in circuit with said magnet for operating the switch, and means to prevent such connection from being made effective until a period between impulses of said device.

38. A telephone system including a selector switch having terminals arranged in groups, telephone circuits extending from said terminals, an electromagnet for operating said switch from group to group, an impulse transmitting device adapted for transmitting impulses to said electromagnet, a primary relay having normally open contacts included in said impulse circuit, an energizing circuit for said primary relay, means for closing said circuit, means to prevent closure of said energizing circuit except between impulse periods of said device, and means for operating said switch to select a contact in the selected group.

In witness whereof, I hereunto subscribe my name this 28th day of January A. D., 1907.

ALBERT M. BULLARD.

Witnesses:
GEORGE A. HAMILTON,
WILLIAM F. LUTTER.

Copies of this patent may be obtained for five cents each, by addressing the "Commissioner of Patents, Washington, D. C."